US012784284B2

(12) United States Patent
Shi et al.

(10) Patent No.: US 12,784,284 B2
(45) Date of Patent: Nov. 3, 2026

(54) FEATURE MAP ENCODING AND DECODING METHOD AND APPARATUS

(71) Applicant: HUAWEI TECHNOLOGIES CO., LTD., Shenzhen (CN)

(72) Inventors: Yibo Shi, Beijing (CN); Yunying Ge, Beijing (CN); Jing Wang, Beijing (CN); Jue Mao, Hangzhou (CN); Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 118 days.

(21) Appl. No.: 18/604,842

(22) Filed: Mar. 14, 2024

(65) Prior Publication Data

US 2024/0221230 A1 Jul. 4, 2024

Related U.S. Application Data

(63) Continuation of application No. PCT/CN2022/117819, filed on Sep. 8, 2022.

(30) Foreign Application Priority Data

Sep. 18, 2021 (CN) .......................... 202111101920.9
Mar. 25, 2022 (CN) .......................... 202210300566.0

(51) Int. Cl.
*G06T 9/00* (2006.01)

(52) U.S. Cl.
CPC .............. *G06T 9/001* (2013.01); *G06T 9/002* (2013.01)

(58) Field of Classification Search
CPC ...... G06T 9/001; G06T 9/002; H03M 7/3079; H03M 7/40; G06N 3/044; G06N 3/045;
(Continued)

(56) References Cited

U.S. PATENT DOCUMENTS 10,127,913 B1 * 11/2018 Mokrushin ............ H04N 19/91
10,380,853 B1 * 8/2019 Solh .................... G06F 18/2321
(Continued)

FOREIGN PATENT DOCUMENTS

| | | | |
|---|---|---|---|
| EP | 4336829 | A1 | 3/2024 |
| JP | 2020191631 | A | 11/2020 |
| JP | 2021096082 | A | 6/2021 |

OTHER PUBLICATIONS

Johannes Balle et al: "Variational Image Compression With a Scale Hyperprior", ICLR 2018, arXiv:1802.01436v2, May 1, 2018, total 23 pages.

(Continued)

*Primary Examiner* — Iriana Cruz
(74) *Attorney, Agent, or Firm* — WOMBLE BOND DICKINSON (US) LLP

(57) ABSTRACT

This application provides a feature map encoding and decoding method and an apparatus, and relates to the field of artificial intelligence (AI)-based data encoding and decoding technologies. The feature map decoding method includes: obtaining a bitstream of a to-be-decoded feature map, where the to-be-decoded feature map includes a plurality of feature elements; obtaining a first probability estimation result corresponding to each feature element based on the bitstream, where the first probability estimation result includes a first peak probability; determining a set of first feature elements and a set of second feature elements from the plurality of feature elements based on a first threshold and the first peak probability corresponding to each feature element; and obtaining a decoded feature map based on the set of first feature elements and the set of second feature elements. This can improve encoding and decoding performance while reducing encoding and decoding complexity.

14 Claims, 11 Drawing Sheets

(58) Field of Classification Search
CPC .... G06N 3/0464; G06N 3/047; G06N 3/0475; G06N 3/048; G06N 3/084; H04N 19/13; H04N 19/172; H04N 19/184; H04N 19/196; H04N 19/42; H04N 19/44; H04N 19/593; H04N 19/91; H04N 19/136
See application file for complete search history.

(56) References Cited

U.S. PATENT DOCUMENTS

| | | | | |
|---|---|---|---|---|
| 2018/0115787 | A1 | 4/2018 | Koo et al. | |
| 2018/0189981 | A1 | 7/2018 | Singh et al. | |
| 2020/0160565 | A1 | 5/2020 | Ma et al. | |
| 2020/0327701 | A1 | 10/2020 | Zhou et al. | |
| 2020/0374522 | A1* | 11/2020 | Zhou | G06N 3/045 |
| 2021/0364298 | A1* | 11/2021 | Gao | G01S 5/0252 |
| 2022/0286696 | A1* | 9/2022 | Gao | H04N 19/147 |
| 2024/0037797 | A1* | 2/2024 | Teo | G06T 7/70 |
| 2024/0046645 | A1* | 2/2024 | Tarashima | G06V 10/82 |
| 2024/0105193 | A1* | 3/2024 | Mao | H03M 7/3079 |

OTHER PUBLICATIONS

Jing Zhou et al:"Multi-scale and Context-adaptive Entropy Model for Image Compression." arXiv:1910.07844v1 [eess.IV] Oct. 17, 2019. total 4 pages.
Sihan Wen et al,"Variational Autoencoder Based Image Compression with Pyramidal Featuresand Context Entropy Model", Jun. 16, 2019, total 4 pages.

* cited by examiner

FEATURE MAP ENCODING AND DECODING METHOD AND APPARATUS

CROSS-REFERENCE TO RELATED APPLICATIONS

This application is a continuation of International Application No. PCT/CN2022/117819, filed on Sep. 8, 2022, which claims priority to Chinese Patent Application No. 202210300566.0, filed on Mar. 25, 2022, and Chinese Patent Application No. 202111101920.9, filed on Sep. 18, 2021. All of the aforementioned patent applications are hereby incorporated by reference in their entireties.

TECHNICAL FIELD

Embodiments of this application relate to the field of artificial intelligence (AI)-based audio/video or image compression technologies, and in particular, to a feature map encoding and decoding method and an apparatus.

BACKGROUND

Image compression is a technology that uses image data features such as spatial redundancy, visual redundancy, and statistical redundancy to represent an original image pixel matrix with fewer bits in a lossy or lossless manner, so as to implement effective transmission and storage of image information. The image compression is classified into lossless compression and lossy compression. The lossless compression does not cause any loss of image details, while the lossy compression achieves a large compression ratio at the cost of reducing image quality to a specific extent. In a lossy image compression algorithm, many technologies are usually used to remove redundant information of image data. For example, a quantization technology is used to eliminate the spatial redundancy caused by a correlation between adjacent pixels in an image and the visual redundancy determined by perception of a human visual system. An entropy coding and transform technology is used to eliminate the statistical redundancy of the image data. Mature lossy image compression standards such as JPEG and BPG have been formed after decades of research and optimization by persons skilled in the art on conventional lossy image compression technologies.

However, if the image compression technology cannot ensure image compression quality while improving compression efficiency, the image compression technology cannot meet increasing requirements of multimedia application data in this era.

SUMMARY

This application provides a feature map encoding and decoding method and an apparatus, to improve encoding and decoding performance while reducing encoding and decoding complexity.

According to a first aspect, this application provides a feature map decoding method. The method includes: obtaining a bitstream of a to-be-decoded feature map, where the to-be-decoded feature map includes a plurality of feature elements; obtaining a first probability estimation result corresponding to each of the plurality of feature elements based on the bitstream of the to-be-decoded feature map, where the first probability estimation result includes a first peak probability; determining a set of first feature elements and a set of second feature elements from the plurality of feature elements based on a first threshold and the first peak probability corresponding to each feature element; and obtaining a decoded feature map based on the set of first feature elements and the set of second feature elements.

Compared with a method for determining a first feature element and a second feature element from a plurality of feature elements based on a first threshold and a corresponding probability to which a numerical value of each feature element that is a fixed value, in this application, the method for determining a first feature element and a second feature element based on the first threshold and the peak probability corresponding to each feature element is more accurate, thereby improving accuracy of the obtained decoded feature map and improving data decoding performance.

In an embodiment, the first probability estimation result is a Gaussian distribution, and the first peak probability is a mean probability of the Gaussian distribution.

Alternatively, the first probability estimation result is a mixed Gaussian distribution. The mixed Gaussian distribution includes a plurality of Gaussian distributions. The first peak probability is a largest value in mean probabilities of the Gaussian distributions, or the first peak probability is calculated based on mean probabilities of the Gaussian distributions and weights of the Gaussian distributions in the mixed Gaussian distribution.

In an embodiment, a value of the decoded feature map includes numerical values of all first feature elements in the set of first feature elements and numerical values of all second feature elements in the set of second feature elements.

In an embodiment, the set of first feature elements is an empty set, or the set of second feature elements is an empty set.

In an embodiment, the first probability estimation result further includes a feature value corresponding to the first peak probability. Further, entropy decoding may be performed on the first feature elements based on first probability estimation results corresponding to the first feature elements, to obtain the numerical values of the first feature elements. The numerical values of the second feature elements are obtained based on feature values corresponding to first peak probabilities of the second feature elements. In this embodiment, compared with assigning a fixed value to a value of an uncoded feature element (that is, a second feature element), in this application, a feature value corresponding to a first peak probability of a second feature element is assigned to a value of an uncoded feature element (that is, the second feature element), thereby improving accuracy of the numerical value of the second feature element in the value of the decoded feature map, and improving the data decoding performance.

In an embodiment, before the determining a set of first feature elements and a set of second feature elements from the plurality of feature elements based on a first threshold and the first peak probability corresponding to each feature element, the first threshold may be further obtained based on the bitstream of the to-be-decoded feature map. In this embodiment, compared with a method in which a first threshold is an empirical preset value, the to-be-decoded feature map corresponds to the first threshold of the to-be-decoded feature map, and changeability and flexibility of the first threshold is increased, thereby reducing a difference between a replacement value of the uncoded feature element (that is, the second feature element) and a true value, and improving the accuracy of the decoded feature map.

In an embodiment, a first peak probability of the first feature element is less than or equal to the first threshold, and a first peak probability of the second feature element is greater than the first threshold.

In an embodiment, the first probability estimation result is the Gaussian distribution. The first probability estimation result further includes a first probability variance value. In this case, a first probability variance value of the first feature element is greater than or equal to the first threshold, and a first probability variance value of the second feature element is less than the first threshold. In this embodiment, when the probability estimation result is the Gaussian distribution, time complexity of determining the first feature element and the second feature element based on the probability variance value is less than time complexity of a manner of determining the first feature element and the second feature element based on the peak probability, thereby improving a data decoding speed.

In an embodiment, side information corresponding to the to-be-decoded feature map is obtained based on the bitstream of the to-be-decoded feature map. The first probability estimation result corresponding to each feature element is obtained based on the side information.

In an embodiment, side information corresponding to the to-be-decoded feature map is obtained based on the bitstream of the to-be-decoded feature map. The first probability estimation result of each feature element is estimated for each feature element in the to-be-decoded feature map based on the side information and first context information. The first context information is a feature element that corresponds to the feature element and that is in a preset region range in the to-be-decoded feature map. In this embodiment, the probability estimation result of each feature element is obtained based on the side information and the context information, thereby improving accuracy of the probability estimation result, and improving encoding and decoding performance.

According to a second aspect, this application provides a feature map encoding method. The method includes: obtaining a first to-be-encoded feature map, where the first to-be-encoded feature map includes a plurality of feature elements; determining a first probability estimation result of each of the plurality of feature elements based on the first to-be-encoded feature map, where the first probability estimation result includes a first peak probability; determining, based on the first peak probability of each feature element in the first to-be-encoded feature map, whether the feature element is a first feature element; and performing entropy encoding on the first feature element only when the feature element is the first feature element.

According to the method in the second aspect, whether entropy encoding needs to be performed on each feature element in the to-be-encoded feature map is determined, thereby skipping encoding processes of some feature elements in the to-be-encoded feature map, significantly reducing a quantity of elements for performing entropy encoding, and reducing entropy encoding complexity. In addition, compared with determining, based on a probability corresponding to a fixed value in a probability estimation result corresponding to each feature element, whether the feature element needs to be encoded, reliability of a determining result (whether entropy encoding needs to be performed on the feature element) is improved based on a probability peak of each feature element, and encoding processes of more feature elements are skipped, thereby further improving an encoding speed and improving encoding performance.

In an embodiment, the first probability estimation result is a Gaussian distribution, and the first peak probability is a mean probability of the Gaussian distribution.

Alternatively, the first probability estimation result is a mixed Gaussian distribution. The mixed Gaussian distribution includes a plurality of Gaussian distributions. The first peak probability is a largest value in mean probabilities of the Gaussian distributions, or the first peak probability is calculated based on mean probabilities of the Gaussian distributions and weights of the Gaussian distributions in the mixed Gaussian distribution.

In an embodiment, for each feature element in the first to-be-encoded feature map, whether the feature element is the first feature element is determined based on a first threshold and the first peak probability of the feature element.

In an embodiment, a second probability estimation result of each of the plurality of feature elements is determined based on the first to-be-encoded feature map, where the second probability estimation result includes a second peak probability. A set of third feature elements is determined from the plurality of feature elements based on the second probability estimation result of each feature element. The first threshold is determined based on second peak probabilities of all feature elements in the set of third feature elements. Entropy encoding is performed on the first threshold. In this embodiment, the first threshold of the to-be-encoded feature map may be determined for the to-be-encoded feature map based on the feature elements of the to-be-encoded feature map, so that the first threshold has better adaptability to the to-be-encoded feature map, thereby improving reliability of a determining result (that is, whether entropy encoding needs to be performed on a feature element) determined based on the first threshold and the first peak probability of the feature element.

In an embodiment, the first threshold is a largest second peak probability in the second peak probabilities corresponding to the feature elements in the set of third feature elements.

In an embodiment, a first peak probability of the first feature element is less than or equal to the first threshold.

In an embodiment, the second probability estimation result is a Gaussian distribution, and the second probability estimation result further includes a second probability variance value. The first threshold is a smallest second probability variance value in second probability variance values corresponding to the feature elements in the set of third feature elements. In this case, the first probability estimation result is the Gaussian distribution, and the first probability estimation result further includes a first probability variance value. The first probability variance value of the first feature element is greater than or equal to the first threshold. In this embodiment, when the probability estimation result is the Gaussian distribution, time complexity of determining the first feature element based on the probability variance value is less than time complexity of determining the first feature element based on the peak probability, thereby improving the data encoding speed.

In an embodiment, the second probability estimation result further includes a feature value corresponding to the second peak probability. Further, the set of third feature elements is determined from the plurality of feature elements based on a preset error, a numerical value of each feature element, and the feature value corresponding to the second peak probability of each feature element.

In an embodiment, a feature element in the set of third feature elements has the following feature: $|\hat{y}(x, y, i)-p(x, y, i)>TH\_2$. $\hat{y}(x, y, i)$ is a numerical value of the feature element. p(x, y, i) is a feature value corresponding to a second peak probability of the feature element. TH_2 is the preset error.

In an embodiment, the first probability estimation result is the same as the second probability estimation result. In this case, side information of the first to-be-encoded feature map is obtained based on the first to-be-encoded feature map. Probability estimation is performed on the side information to obtain the first probability estimation result of each feature element.

In an embodiment, the first probability estimation result is different from the second probability estimation result. In this case, side information of the first to-be-encoded feature map and second context information of each feature element are obtained based on the first to-be-encoded feature map. The second context information is a feature element that corresponds to the feature element and that is in a preset region range in the first to-be-encoded feature map. The second probability estimation result of each feature element is obtained based on the side information and the second context information.

In an embodiment, the side information of the first to-be-encoded feature map is obtained based on the first to-be-encoded feature map. For any feature element in the first to-be-encoded feature map, a first probability estimation result of the feature element is determined based on first context information and the side information. The first probability estimation result further includes a feature value corresponding to the first probability peak. The first context information is a feature element that corresponds to the feature element and that is in a preset region range in a second to-be-encoded feature map. A value of the second to-be-encoded feature map includes a numerical value of the first feature element and a feature value corresponding to a first peak probability of a second feature element. The second feature element is a feature element other than the first feature element in the first to-be-encoded feature map. In this manner, the probability estimation result of each feature element is obtained with reference to the side information and the context information, thereby improving accuracy of the probability estimation result of each feature element compared with a manner in which a probability estimation result of each feature element is obtained based on only side information.

In an embodiment, entropy encoding results of all first feature elements are written into an encoded bitstream.

According to a third aspect, this application provides a feature map decoding apparatus, including:

an obtaining module, configured to: obtain a bitstream of a to-be-decoded feature map, where the to-be-decoded feature map includes a plurality of feature elements; and obtain a first probability estimation result corresponding to each of the plurality of feature elements based on the bitstream of the to-be-decoded feature map, where the first probability estimation result includes a first peak probability; and a decoding module, configured to: determine a set of first feature elements and a set of second feature elements from the plurality of feature elements based on a first threshold and the first peak probability corresponding to each feature element; and obtain a decoded feature map based on the set of first feature elements and the set of second feature elements.

For further implementation functions of the obtaining module and the decoding module, refer to any one of the first aspect or the implementations of the first aspect. Details are not described herein again.

According to a fourth aspect, this application provides a feature map encoding apparatus, including:

an obtaining module, configured to obtain a first to-be-encoded feature map, where the first to-be-encoded feature map includes a plurality of feature elements; and an encoding module, configured to: determine a first probability estimation result of each of the plurality of feature elements based on the first to-be-encoded feature map, where the first probability estimation result includes a first peak probability; determine, based on the first peak probability of each feature element in the first to-be-encoded feature map, whether the feature element is a first feature element; and perform entropy encoding on the first feature element only when the feature element is the first feature element.

For further implementation functions of the obtaining module and the encoding module, refer to any one of the second aspect or the implementations of the second aspect. Details are not described herein again.

According to a fifth aspect, this application provides a decoder. The decoder includes a processing circuit, and is configured to determine the method according to any one of the first aspect and the implementations of the first aspect.

According to a sixth aspect, this application provides an encoder. The encoder includes a processing circuit, and is configured to determine the method according to any one of the second aspect and the implementations of the second aspect.

According to a seventh aspect, this application provides a computer program product, including program code. When the program code is determined by a computer or a processor, the method according to any one of the first aspect and the implementations of the first aspect, or the method according to any one of the second aspect and the implementations of the second aspect is determined.

According to an eighth aspect, this application provides a decoder, including: one or more processors; and a non-transitory computer-readable storage medium, coupled to the processor and storing a program determined by the processor. When determined by the processor, the program enables the decoder to determine the method according to any one of the first aspect and the implementations of the first aspect.

According to a ninth aspect, this application provides an encoder, including: one or more processors; and a non-transitory computer-readable storage medium, coupled to the processor and storing a program determined by the processor. When determined by the processor, the program enables the encoder to determine the method according to any one of the second aspect and the implementations of the second aspect.

According to a tenth aspect, this application provides a non-transitory computer-readable storage medium, including program code. When the program code is determined by a computer device, the method according to any one of the first aspect and the implementations of the first aspect, or the method according to any one of the second aspect and the implementations of the second aspect is determined.

According to an eleventh aspect, this application relates to a decoding apparatus. The decoding apparatus has a function of implementing behavior according to any one of the first aspect or the method embodiments of the first aspect. The function may be implemented by hardware, or may be implemented by hardware determining corresponding software. The hardware or the software includes one or more modules corresponding to the foregoing function.

According to a twelfth aspect, this application relates an encoding apparatus. The encoding apparatus has a function of implementing behavior according to any one of the second aspect or the method embodiments of the second aspect. The function may be implemented by hardware, or may be implemented by hardware determining corresponding software. The hardware or the software includes one or more modules corresponding to the foregoing function.

DETAILED DESCRIPTION

Figure 1:
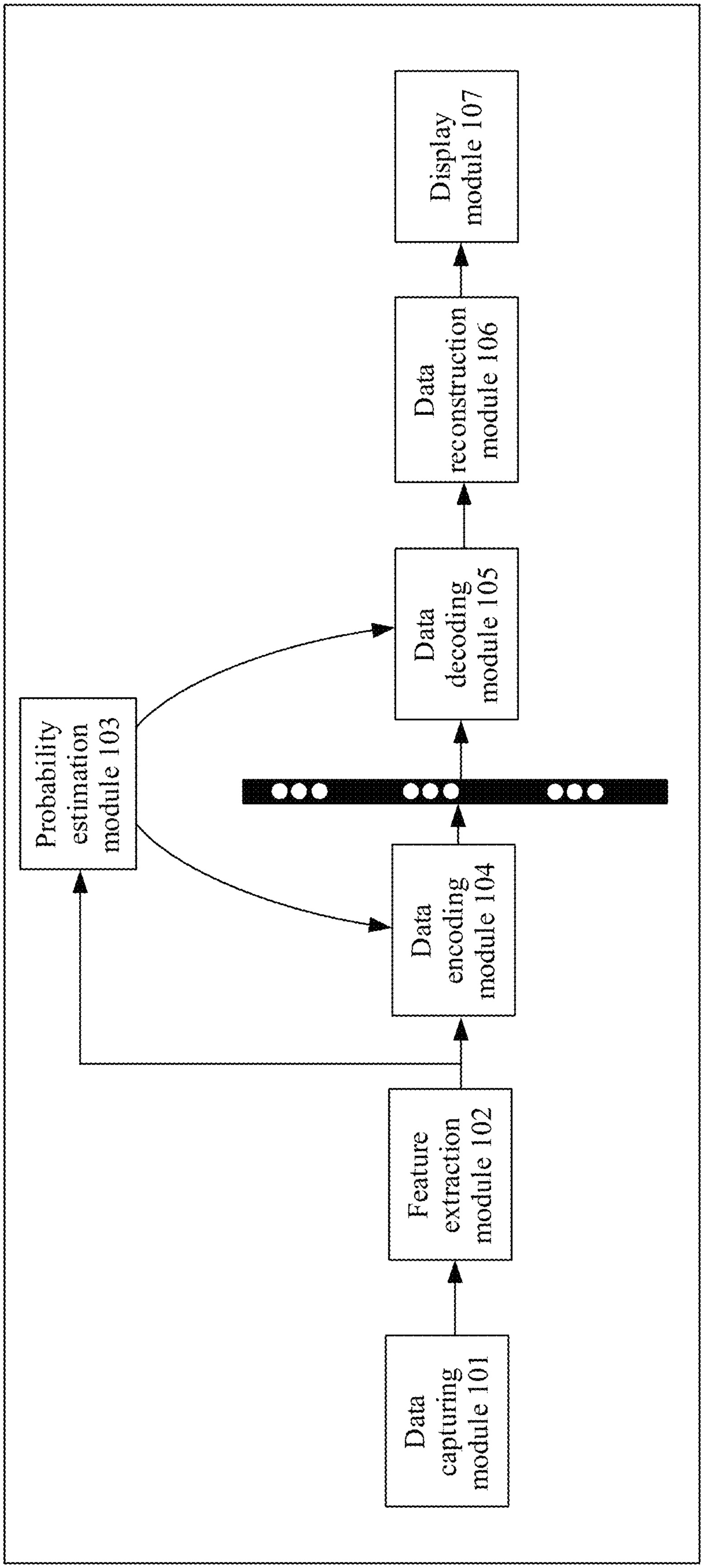
FIG. 1 is a schematic diagram of an architecture of a data coding system according to an embodiment of this application.

The following clearly and completely describes technical solutions in embodiments of this application with reference to accompanying drawings. It is clear that the described embodiments are merely some but not all embodiments of this application.

It should be noted that in the specification and accompanying drawings of this application, the terms "first", "second", and the like are intended to distinguish between different objects or distinguish between different processing of a same object, but are not used to describe a particular order of the objects. In addition, the terms "including", "having", or any other variant thereof in descriptions of this application are intended to cover a non-exclusive inclusion. For example, a process, a method, a system, a product, or a device that includes a series of operations or units is not limited to the listed operations or units, but may include other unlisted operations or units, or may include other inherent operations or units of the process, the method, the product, or the device. It should be noted that in embodiments of this application, the word "an example", "for example", or the like is used to represent giving an example, an illustration, or a description. Any embodiment or design scheme described as "example" or "for example" in embodiments of this application should not be explained as being more preferred or having more advantages than another embodiment or design scheme. In an embodiment, use of the words "example" and "for example" is intended to present a relevant concept in a specific way. In embodiments of this application, "A and/or B" represents two meanings: A and B, and A or B. "A, and/or B, and/or C" represents any one of A, B, and C, or represents any two of A, B, and C, or represents A, B, and C. The following describes the technical solutions of this application with reference to the accompanying drawings.

A feature map decoding method and a feature map encoding method provided in embodiments of this application can be used in the data coding field (including the audio coding field, the video coding field, and the image coding field). In an embodiment, the feature map decoding method and the feature map encoding method may be used in a scenario of album management, human-computer interaction, audio compression or transmission, video compression or transmission, image compression or transmission, and data compression or transmission. It should be noted that, for ease of understanding, embodiments of this application are merely described by using an example in which the feature map decoding method and the feature map encoding method are used in the image coding field, and this cannot be considered as a limitation on the method provided in this application.

In an embodiment, an example in which the feature map encoding method and the feature map decoding method are used in an end-to-end image feature map encoding and decoding system is used. The end-to-end image feature map encoding and decoding system includes two parts: image encoding and image decoding. The image encoding is determined at a source end, and usually includes processing (for example, by compressing) an original video image to reduce an amount of data required for representing the video image (for more efficient storage and/or transmission). The image decoding is determined at a destination end, and usually includes inverse processing relative to an encoder to reconstruct an image. In the end-to-end image feature map encoding and decoding system, according to the feature map decoding method and the feature map encoding method provided in this application, whether entropy encoding needs to be performed on each feature element in the to-be-encoded feature map can be determined, thereby skipping encoding processes of some feature elements, reducing a quantity of elements for performing entropy encoding, and reducing entropy encoding complexity. In addition, reliability of a determining result (whether entropy encoding needs to be performed on the feature element) is improved based on a probability peak of each feature element, thereby improving image compression performance.

Embodiments of this application relate to massive application of a neural network.

Therefore, for ease of understanding, the following first describes terms and concepts related to the neural network in embodiments of this application.

1. Entropy Coding

Entropy coding is a coding process in which no information is lost according to an entropy principle. The entropy coding uses an entropy coding algorithm or solution in a quantization coefficient or another syntax element, to obtain coded data that can be output by an output end in a form of a coded bitstream or the like, so that a decoder or the like can receive and use a parameter used for decoding. The coded bitstream may be transmitted to the decoder, or stored in a memory for later transmission or retrieval by the decoder. The entropy coding algorithm or solution includes but is not limited to: a variable-length coding (VLC) solution, a context-adaptive VLC solution (CALVC), an arithmetic coding scheme, a binarization algorithm, context-adaptive binary arithmetic coding (CABAC), syntax-based context-adaptive binary arithmetic coding (SBAC), probability interval partitioning entropy (PIPE) coding, or another entropy coding method or technology.

2. Neural Network

The neural network may include a neuron. The neuron may be an operation unit that uses $x_s$ and an intercept of 1 as an input. An output of the operation unit may be shown as a formula (1):

$$h_{W,b}(x) = f(W^T x) = f\left(\sum\nolimits_{s=1}^{n} W_s x_s + b\right) \tag{1}$$

s=1, 2, . . . , or n, n is a natural number greater than 1, $W_s$ is a weight of $x_s$, and b is a bias of the neuron. f is an activation function (activation function) of the neuron, used to introduce a nonlinear feature into the neural network, to convert an input signal in the neuron into an output signal. The output signal of the activation function may serve as an input of a next convolutional layer. The activation function may be a sigmoid function. The neural network is a network formed by connecting many single neurons together. To be specific, an output of a neuron may be an input of another neuron. An input of each neuron may be connected to a local receptive field of a previous layer to extract a feature of the local receptive field. The local receptive field may be a region including several neurons.

3. Deep Neural Network (DNN)

The DNN is also referred to as a multi-layer neural network, and may be understood as a neural network having a plurality of hidden layers. The DNN is divided based on locations of different layers, so that the neural network in the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems complex, work of each layer is not complex. Simply speaking, the DNN is indicated by the following linear relationship expression: $y=\alpha(Wx+b)$. X is an input vector, y is an output vector, b is a bias vector, W is a weight matrix (also referred to as a coefficient), and $\alpha()$ is an activation function. At each layer, the output vector y is obtained by performing such a simple operation on the input vector X. Due to a large quantity of DNN layers, quantities of coefficients W and bias vectors b are also large. These parameters are defined in the DNN as follows: The coefficient W is used as an example. It is assumed that in a three-layer DNN, a linear coefficient from a fourth neuron at a second layer to a second neuron at a third layer is defined as $$W_{24}^{3}.$$

The superscript 3 represents a layer at which the coefficient W is located, and the subscript corresponds to an output third-layer index 2 and an input second-layer index 4.

In conclusion, a coefficient from a $k^{th}$ neuron at an $(L-1)^{th}$ layer to a $j^{th}$ neuron at an $L^{th}$ layer is defined as $$W_{jk}^{L}.$$

It should be noted that the input layer does not have the parameters W. In the deep neural network, more hidden layers make the network more capable of describing a complex case in the real world. Theoretically, a model with more parameters has higher complexity and a larger "capacity". It indicates that the model can complete a more complex learning task. A process of training the deep neural network is a process of learning a weight matrix, and a final objective of training is to obtain a weight matrix (a weight matrix formed by vectors W at a plurality of layers) at all layers of a trained deep neural network.

4. Convolutional Neural Network (CNN)

The CNN is a deep neural network with a convolutional structure. The convolutional neural network includes a feature extractor including a convolutional layer and a sub-sampling layer. The feature extractor may be considered as a filter. A convolution process may be considered as performing convolution by using a trainable filter and an input image or a convolutional feature plane (feature map). The convolutional layer is a neuron layer that is in the convolutional neural network and at which convolution processing is performed on an input signal. At the convolutional layer of the convolutional neural network, one neuron may be connected only to some adjacent-layer neurons. One convolutional layer usually includes several feature planes, and each feature plane may include some neurons that are in a rectangular arrangement. Neural units in a same feature plane share a weight, and the weight shared herein is a convolutional kernel. Weight sharing may be understood as that an image information extraction manner is irrelevant to a location. A principle implied herein is that statistical information of a part of an image is the same as that of other parts. This means that image information learned in a part can also be used in another part. Therefore, the same image information obtained through learning can be used for all locations on the image. At a same convolutional layer, a plurality of convolutional kernels may be used to extract different image information. Usually, a larger quantity of convolutional kernels indicates richer image information reflected in a convolution operation.

The convolutional kernel may be initialized in a form of a random-size matrix. In a process of training the convolutional neural network, the convolutional kernel may obtain an appropriate weight through learning. In addition, benefits directly brought by weight sharing are that connections between layers of the convolutional neural network are reduced, and an overfitting risk is reduced.

5. Recurrent Neural Network (RNN)

In a real world, many elements are ordered and interconnected. To enable machines to have a memory capability like humans, the RNN is developed to perform inference from context.

The RNN processes sequence data. To be specific, a current output of a sequence is also related to a previous output. In other words, an output of the RNN depends on current input information and history memory information. A specific representation form is that the network memorizes previous information and applies the previous information to calculation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN. An error back propagation algorithm is also used, but there is a difference: If the RNN is expanded, a parameter (such as W) of the RNN is shared. This is different from the conventional neural network described in the foregoing example. In addition, during use of a gradient descent algorithm, an output in each operation depends not only on a network in a current operation, but also on a network status in several previous operations. The learning algorithm is referred to as a back propagation through time (BPTT) algorithm.

6. Loss Function

In a process of training the deep neural network, because it is expected that an output of the deep neural network is as much as possible close to a predicted value that is actually expected, a predicted value of a current network and a target value that is actually expected may be compared, and then a weight vector of each layer of the neural network is updated based on a difference between the predicted value and the target value (certainly, there is usually an initialization process before the first update, to be specific, parameters are preconfigured for all layers of the deep neural network). For example, if the predicted value of the network is large, the weight vector is adjusted to decrease the predicted value, and adjustment is continuously performed, until the deep neural network can predict the target value that is actually expected or a value that is very close to the target value that is actually expected. Therefore, "how to obtain, through comparison, a difference between the predicted value and the target value" needs to be predefined. This is a loss function (loss function) or an objective function. The loss function and the objective function are important equations that measure the difference between the predicted value and the target value. The loss function is used as an example. A higher output value (loss) of the loss function indicates a larger difference. Therefore, training of the deep neural network is a process of minimizing the loss as much as possible.

7. Back Propagation Algorithm

The convolutional neural network may correct a value of a parameter in an initial super-resolution model in a training process according to an error back propagation (back propagation, BP) algorithm, so that an error loss of reconstructing the super-resolution model becomes smaller. In an embodiment, an input signal is transferred forward until an error loss occurs at an output, and the parameter in the initial super-resolution model is updated based on back propagation error loss information, to make the error loss converge. The back propagation algorithm is an error-loss-centered back propagation motion intended to obtain a parameter, such as a weight matrix, of an optimal super-resolution model.

8. Generative Adversarial Network

The generative adversarial network (GAN) is a deep learning model. The model includes at least two modules: One module is a generative model (Generative Model), and the other module is a discriminative model. The two modules are used to learn through gaming with each other, to generate a better output. Both the generative model and the discriminative model may be neural networks, and may be deep neural networks or convolutional neural networks. A basic principle of the GAN is as follows: Using a GAN for generating a picture as an example, it is assumed that there are two networks: G (Generator) and D (Discriminator). G is a network for generating a picture. G receives random noise z, and generates the picture by using the noise, where the picture is denoted as G(z). D is a discriminator network used to determine whether a picture is "real". An input parameter of D is x, x represents a picture, and an output D(x) represents a probability that x is a real picture. If a value of D(x) is 1, it indicates that the picture is 100% real. If the value of D(x) is 0, it indicates that the picture cannot be real. In a process of training the generative adversarial network, an objective of the generative network G is to generate a picture that is as real as possible to deceive the discriminative network D, and an objective of the discriminative network D is to distinguish between the picture generated by G and a real picture as much as possible. In this way, a dynamic "gaming" process, to be specific, "adversary" in the "generative adversarial network", exists between G and D. A final gaming result is that in an ideal state, G may generate an image G(z) that is to be difficultly distinguished from a real image, and it is difficult for D to determine whether the image generated by G is real. To be specific, D(G(z))=0.5. In this way, an excellent generative model G is obtained, and can be used to generate a picture.

9. Pixel Value

A pixel value of an image may be a red-green-blue (RGB) color value. The pixel value may be a long integer representing a color. For example, the pixel value is 256*Red+100*Green+76*Blue, where Blue represents a blue component, Green represents a green component, and Red represents a red component. In each color component, a smaller numerical value indicates a lower brightness, and a larger numerical value indicates a higher brightness. For a grayscale image, the pixel value may be a grayscale value.

The following describes a system architecture provided in embodiments of this application. FIG. 1 shows an architecture of a data coding system according to an embodiment of this application. The architecture of the data coding system includes a data capturing module 101, a feature extraction module 102, a probability estimation module 103, a data encoding module 104, a data decoding module 105, a data reconstruction module 106, and a display module 107.

The data capturing module 101 is configured to capture an original image. The data capturing module 101 may include or be any kind of image capturing device, for example for capturing a real-world image, and/or any type of an image generating device, for example a computer graphics processing unit for generating a computer animated image, or any type of other device for obtaining and/or providing a real-world image, a computer generated image (for example, screen content, a virtual reality (VR) image) and/or any combination thereof (for example, an augmented reality (AR) image). The data capturing module 101 may also be any type of memory or storage for storing the image.

The feature extraction module 102 is configured to receive the original image from the data capturing module 101, pre-process the original image, and further extract a feature map (that is, a to-be-encoded feature map) from a pre-processed image through a feature extraction network. The feature map (that is, the to-be-encoded feature map) includes a plurality of feature elements. In an embodiment, the pre-processing on the original image includes but is not limited to: trimming, color format conversion (for example, conversion from RGB to YCbCr), color correction, denoising, normalization, or the like. The feature extraction network may be one or a variant of the neural network, the DNN, the CNN, or the RNN. A specific form of the feature extraction network is not limited herein. In an embodiment, the feature extraction module 102 is further configured to perform rounding on the feature map (that is, the to-be-encoded feature map) through, for example, scalar quantization or vector quantization. It should be learned that the feature map includes the plurality of feature elements, and a value of the feature map includes numerical values of all feature elements. In an embodiment, the feature extraction module 102 further includes a side information extraction network. To be specific, in addition to outputting the feature map output by the feature extraction network, the feature extraction module 102 further outputs side information that is of the feature map and that is extracted through the side information extraction network. The side information extraction network may be one or a variant of the neural network, the DNN, the CNN, or the RNN. A specific form of the feature extraction network is not limited herein.

Figure 2A:
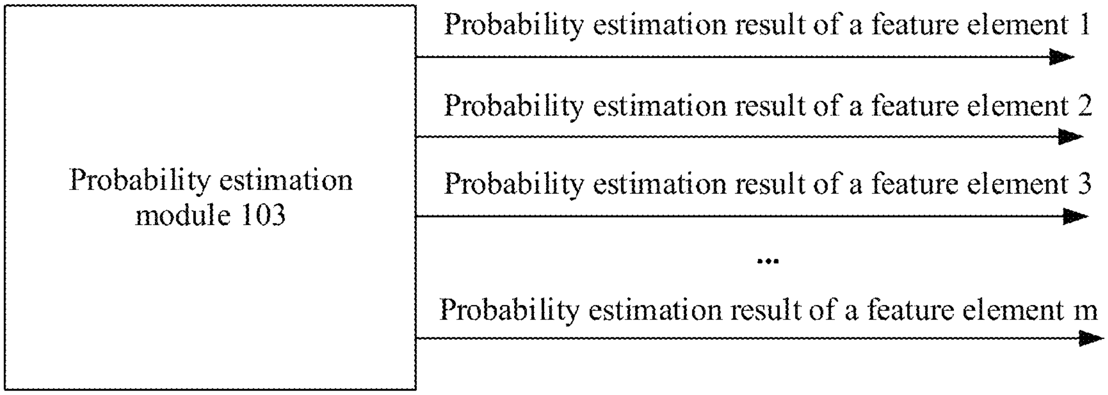
FIG. 2*a* is a schematic diagram of an output result of a probability estimation module 103 according to an embodiment of this application.
Figure 2B:
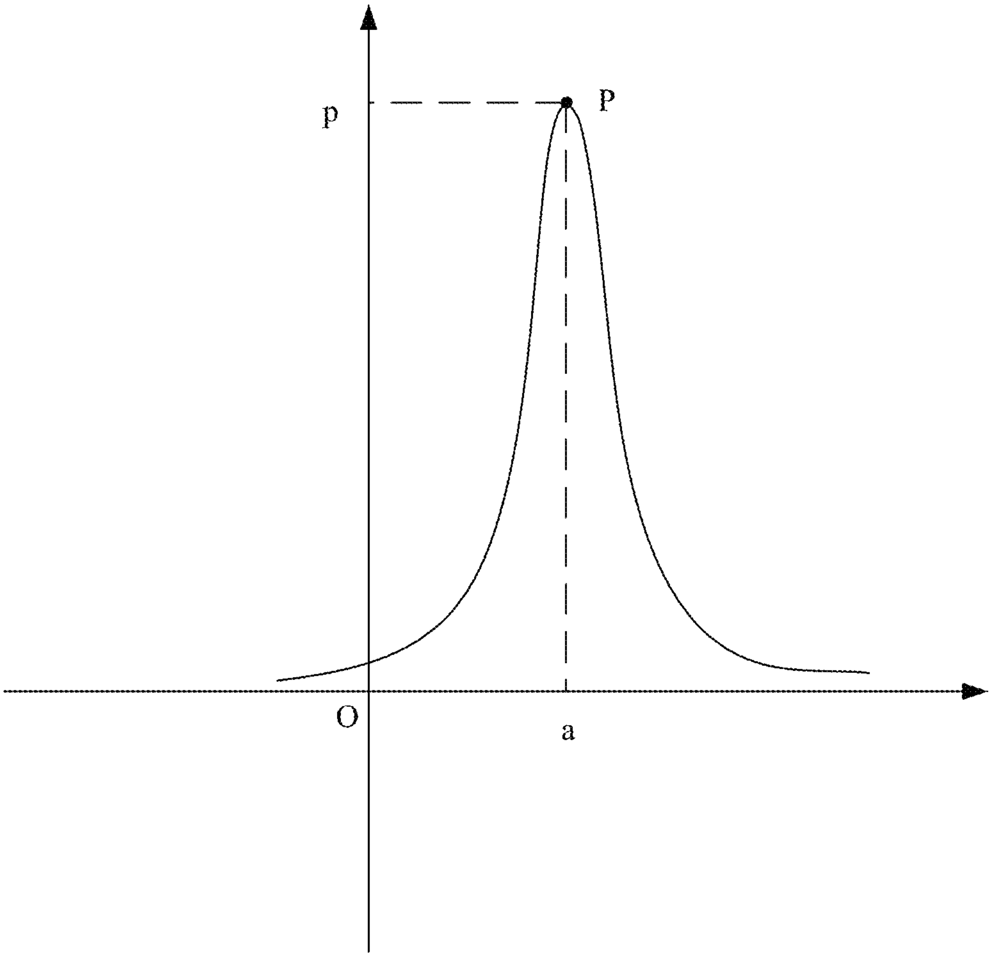
FIG. 2*b* is a schematic diagram of a probability estimation result according to an embodiment of this application.

The probability estimation module 103 estimates a probability of a value corresponding to each of the plurality of feature elements of the feature map (that is, the to-be-encoded feature map). For example, the to-be-encoded feature map includes m feature elements, where m is a positive integer. As shown in FIG. 2*a*, the probability estimation module 103 outputs a probability estimation result of each of the m feature elements. For example, a probability estimation result of a feature element may be shown in FIG. 2*b*. A horizontal coordinate in FIG. 2*b* is a possible numerical value of a feature element (or referred to as a possible value of the feature element). A vertical coordinate indicates a possibility of each possible numerical value (or referred to as a possible value of the feature element). For example, a point P indicates that a probability of a value of the feature element being [a−0.5, a+0.5] is p.

The data encoding module 104 is configured to perform entropy encoding based on the feature map (that is, the to-be-encoded feature map) from the feature extraction module 102 and a probability estimation result of each feature element from the probability estimation module 103, to generate an encoded bitstream (also referred to as a bitstream of a to-be-decoded feature map in this specification).

The data decoding module 105 is configured to receive the encoded bitstream from the data encoding module 104, and further perform entropy decoding based on the encoded bitstream and the probability estimation result of each feature element from the probability estimation module 103, to obtain a decoded feature map (or understood as a value of the decoded feature map).

The data reconstruction module 106 is configured to perform post-processing on the decoded image feature map from the data decoding module 105, and perform image reconstruction on the post-processed decoded image feature map through an image reconstruction network, to obtain a decoded image. The post-processing operation includes but is not limited to color format conversion (for example, conversion from YCbCr to RGB), color correction, trimming, resampling, or the like. The image reconstruction network may be one or a variant of the neural network, the DNN, the CNN, or the RNN. A specific form of the feature extraction network is not limited herein.

The display module 107 is configured to display the decoded image from the data reconstruction module 106, to display the image to a user, a viewer, or the like. The display module 107 may be or include any type of player or display for representing reconstructed audio or a reconstructed image, for example, an integrated or external display or display. For example, the display may include a liquid crystal display (LCD), an organic light-emitting diode (OLED) display, a plasma display, a projector, a micro LED display, a liquid crystal on silicon (LCoS) display, a digital light processor (DLP), or any class of other display.

It should be noted that the architecture of the data coding system may be a functional module of a device. The architecture of the data coding system may alternatively be an end-to-end data coding system, that is, the architecture of the data coding system includes two devices: a source device and a destination device. The source device may include the data capturing module 101, the feature extraction module 102, the probability estimation module 103, and the data encoding module 104. The destination device may include the data decoding module 105, the data reconstruction module 106, and the display module 107. In manner 1 in which the source device is configured to provide the encoded bitstream to the destination device, the source device may send the encoded bitstream to the destination device through a communication interface. The communication interface may be a direct communication link between the source device and the destination device, for example, a direct wired or wireless connection, or through any type of network, for example, a wired network, a wireless network, any combination thereof, any type of a private network and a public network, or any combination thereof. In manner 2 in which the source device is configured to provide the encoded bitstream to the destination device, the source device may store the encoded bitstream in a storage device, and the destination device may obtain the encoded bitstream from the storage device.

It should be noted that the feature map encoding method mentioned in this application may be mainly performed by the probability estimation module 103 and the data encoding module 104 in FIG. 1. The feature map decoding method mentioned in this application may be mainly performed by the probability estimation module 103 and the data decoding module 105 in FIG. 1.

In an example, the feature map encoding method provided in this application is performed by an encoding device, and the encoding device may mainly include the probability estimation module 103 and the data encoding module 104 in FIG. 1. For the feature map encoding method provided in this application, the encoding device may perform the following operations: operation 11 to operation 14.

Operation 11: The encoding device obtains a first to-be-encoded feature map, where the first to-be-encoded feature map includes a plurality of feature elements.

Operation 12: The probability estimation module 103 in the encoding device determines a first probability estimation result of each of the plurality of feature elements based on the first to-be-encoded feature map, where the first probability estimation result includes a first peak probability.

Operation 13: The encoding device determines, based on the first peak probability of each feature element in the first to-be-encoded feature map, whether the feature element is a first feature element.

Operation 14: The data encoding module 104 in the encoding device performs entropy encoding on the first feature element only when the feature element is the first feature element.

In another example, the feature map decoding method provided in this application is performed by a decoding device, and the decoding device mainly includes the probability estimation module 103 and the data decoding module 105 in FIG. 1. For the feature map decoding method provided in this application, the decoding device may include the following operations: operation 21 to operation 24.

Operation 21: The decoding device obtains a bitstream of a to-be-decoded feature map, where the to-be-decoded feature map includes a plurality of feature elements.

Operation 22: The probability estimation module 103 in the decoding device obtains a first probability estimation result corresponding to each of the plurality of feature elements based on the bitstream of the to-be-decoded feature map, where the first probability estimation result includes a first peak probability.

Operation 23: The decoding device determines a set of first feature elements and a set of second feature elements from the plurality of feature elements based on a first threshold and the first peak probability corresponding to each feature element.

Operation 24: The data decoding module 105 in the decoding device obtains a decoded feature map based on the set of first feature elements and the set of second feature elements.

The following describes in detail embodiments of the feature map decoding method and the feature map encoding method provided in this application with reference to the accompanying drawings. In the following, a schematic diagram of a performing procedure at an encoder side shown in FIG. 3 and a schematic diagram of a performing procedure at a decoder side shown in FIG. 5 may be considered as a schematic flowchart of a feature map encoding and decoding method. A schematic diagram of a performing procedure at an encoder side shown in FIG. 6*a* and a schematic diagram of a performing procedure at a decoder side shown in FIG. 7*a* may be considered as a schematic flowchart of a feature map encoding and decoding method.

Figure 3:
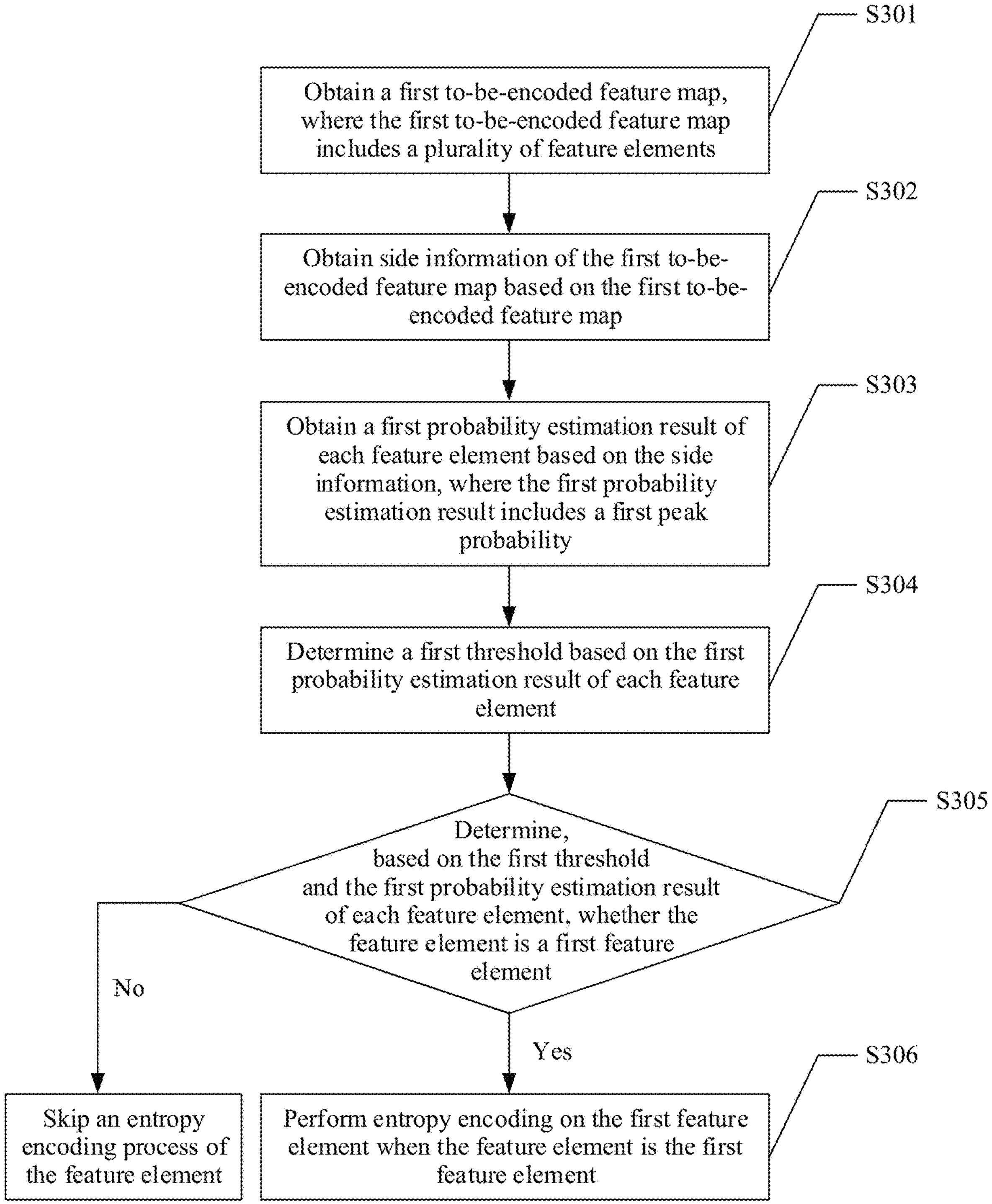
FIG. 3 is a schematic flowchart of a feature map encoding method according to an embodiment of this application.

Encoder side: FIG. 3 is a schematic flowchart of a feature map encoding method according to an embodiment of this application. A procedure of the feature map encoding method includes S301 to S306.

S301: Obtain a first to-be-encoded feature map, where the first to-be-encoded feature map includes a plurality of feature elements.

After feature extraction is performed on original data, a to-be-encoded feature map y is obtained. Further, the to-be-encoded feature map y is quantized, that is, a feature value of a floating point number is rounded to obtain an integer feature value, to obtain a quantized to-be-encoded feature map ŷ (that is, the first to-be-encoded feature map), and a feature element in the feature map ŷ is indicated by ŷ[x][y][i]. In a specific example, for details, refer to the specific description of the original image captured by the data capturing module 101 shown in FIG. 1, and the specific description of obtaining the to-be-encoded feature map by the feature extraction module 102.

S302: Obtain side information of the first to-be-encoded feature map based on the first to-be-encoded feature map.

The side information may be understood as a feature map obtained through further feature extraction on the to-be-encoded feature map, and a quantity of feature elements included in the side information is less than a quantity of feature elements in the to-be-encoded feature map.

In an embodiment, the side information of the first to-be-encoded feature map may be obtained through a side information extraction network. The side information extraction network may use an RNN, a CNN, a variant of the RNN, a variant of the CNN, or another deep neural network (or a variant of another deep neural network). This is not limited in this application.

S303: Obtain a first probability estimation result of each feature element based on the side information, where the first probability estimation result includes a first peak probability.

Figure 4A:
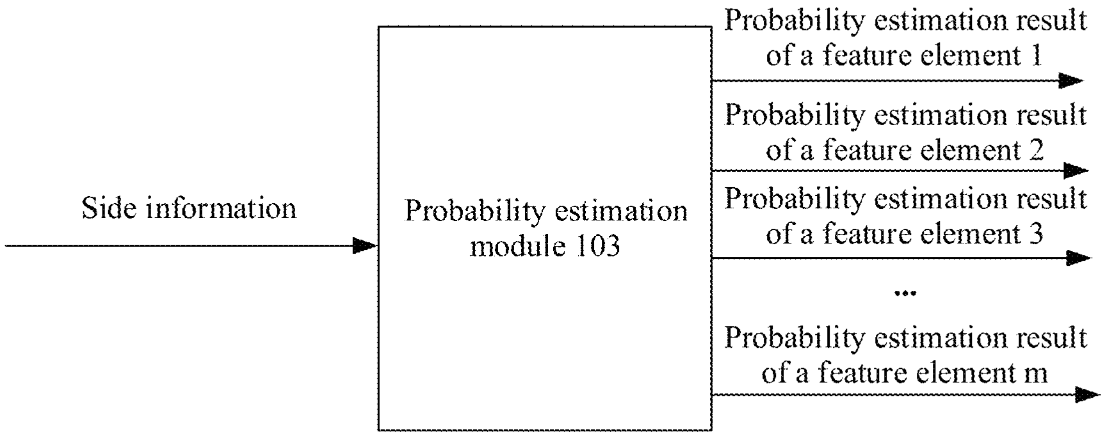
FIG. 4*a* is a schematic diagram of input and output results of a probability estimation module 103 according to an embodiment of this application.
Figure 4B:
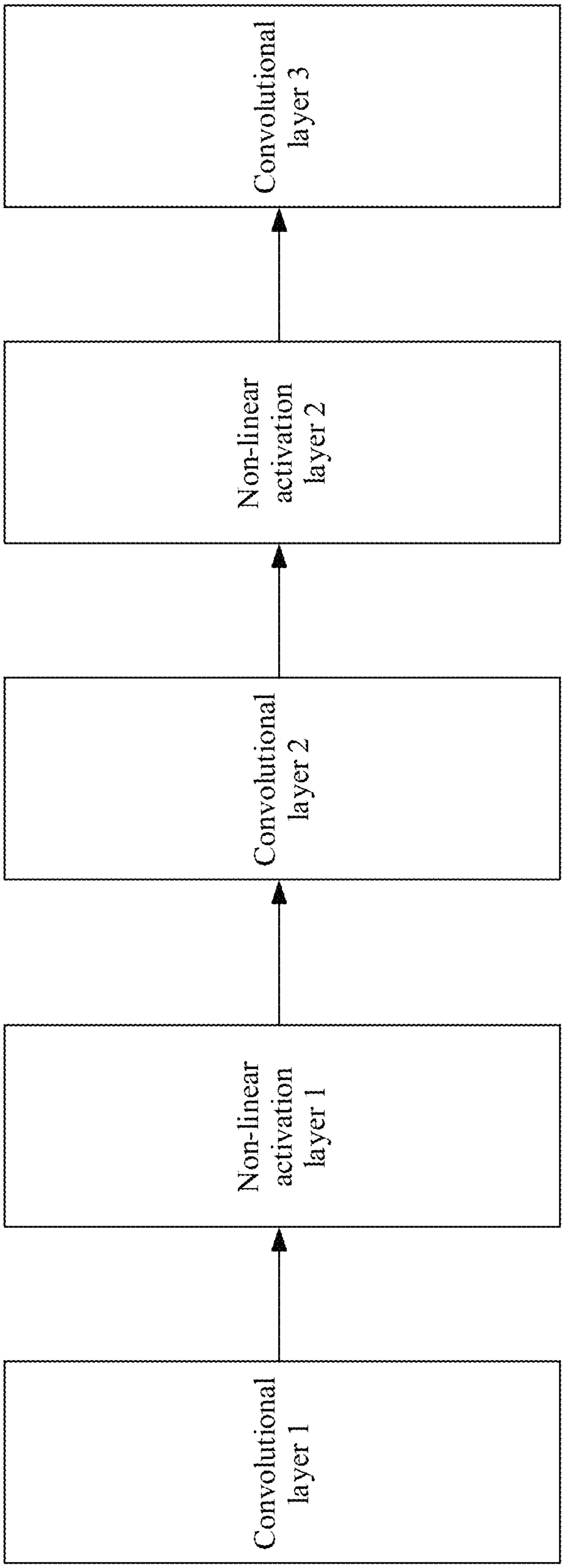
FIG. 4*b* is a schematic diagram of a structure of a probability estimation network according to an embodiment of this application.

As shown in FIG. 4*a*, the side information is used as an input into the probability estimation module 103 in FIG. 1, and an output from the probability estimation module 103 is the first probability estimation result of each feature element. The probability estimation module 103 may be a probability estimation network, and the probability estimation network may use the RNN, the CNN, the variant of the RNN, the variant of the CNN, or another deep neural network (or the variant of another deep neural network). FIG. 4*b* is a schematic diagram of a structure of a probability estimation network. In FIG. 4*b*, the probability estimation network is a convolutional network, and the convolutional network includes five network layers: three convolutional layers and two non-linear activation layers. The probability estimation module 103 may alternatively be implemented according to a non-network conventional probability estimation method. The probability estimation method includes but is not limited to statistical methods such as maximum likelihood estimation, maximum a posteriori estimation, and maximum likelihood estimation.

For any feature element ŷ[x][y][i] in the first to-be-encoded feature map, a first probability estimation result of the feature element ŷ[x][y][i] is a probability of each possible value (or referred to as each possible numerical value) of the feature element ŷ[x][y] [i]. Refer to FIG. 2*b*. For example, a horizontal axis indicates each possible value (or referred to as each possible numerical value) of the feature element ŷ[x][y][i], and a vertical axis indicates a possibility of each possible value (or referred to as each possible numerical value). The first peak probability is a largest probability in the first probability estimation result, and may also be referred to as a probability peak in the first probability estimation result. As shown in FIG. 2*b*, a numerical value p on a vertical coordinate of a point P is the first peak probability in the first probability estimation result.

In an embodiment, the first probability estimation result is a Gaussian distribution, and the first peak probability is a mean probability of the Gaussian distribution. For example, the first probability estimation result is a Gaussian distribution shown in FIG. 2*b*, and the first peak is a mean probability of the Gaussian distribution, that is, a probability p corresponding to a mean value a.

In another embodiment, the first probability estimation result is a mixed Gaussian distribution. The mixed Gaussian distribution includes a plurality of Gaussian distributions. In other words, the mixed Gaussian distribution may be obtained by multiplying the Gaussian distributions by weights of the Gaussian distributions through weighing. In a possible case, the first peak probability is a largest value in mean probabilities of the Gaussian distributions. Alternatively, in another possible case, the first peak probability is calculated based on mean probabilities of the Gaussian distributions and weights of the Gaussian distributions in the mixed Gaussian distribution.

For example, the first probability estimation result is the mixed Gaussian distribution, and the mixed Gaussian distribution is obtained by weighing a Gaussian distribution 1, a Gaussian distribution 2, and a Gaussian distribution 3. A weight of the Gaussian distribution 1 is $w_1$, a weight of the Gaussian distribution 2 is $w_2$, and a weight of the Gaussian distribution 3 is $w_3$. A mean probability of the Gaussian distribution 1 is $p_1$. A mean probability of the Gaussian distribution 2 is $p_2$. A mean probability of the Gaussian distribution 3 is $p_3$. $P_1>p_2>p_3$. When the first peak probability is a largest value in mean probabilities of the Gaussian distributions, the first peak probability is a largest value of mean probabilities of the Gaussian distributions (that is, the mean probability of the Gaussian distribution 1 is $p_1$). When the first peak probability is calculated based on the mean probabilities of the Gaussian distributions and the weights of the Gaussian distributions in the mixed Gaussian distribution, the first peak probability is shown in formula (2).

$$\text{First peak probability} = p_1 \times w_1 + p_2 \times w_2 + p_3 \times w_3 \tag{2}$$

It should be learned that, when the first probability estimation result is the mixed Gaussian distribution, weights corresponding to Gaussian distributions in the mixed Gaussian distribution may be obtained and output through the probability estimation network (for example, the probability estimation module 103). In other words, when obtaining the first probability estimation result (that is, the mixed Gaussian distribution) of each feature element, the probability estimation network also obtains the weights corresponding to the Gaussian distributions included in the mixed Gaussian distribution.

S304: Determine a first threshold based on the first probability estimate result of each feature element.

In an embodiment, a set of third feature elements is determined from the plurality of feature elements in the first to-be-encoded feature map based on the first probability estimation result of each feature element in the first to-be-encoded feature map. Further, the first threshold is determined based on first probability estimation results of all feature elements in the set of third feature elements.

Figure 4C:
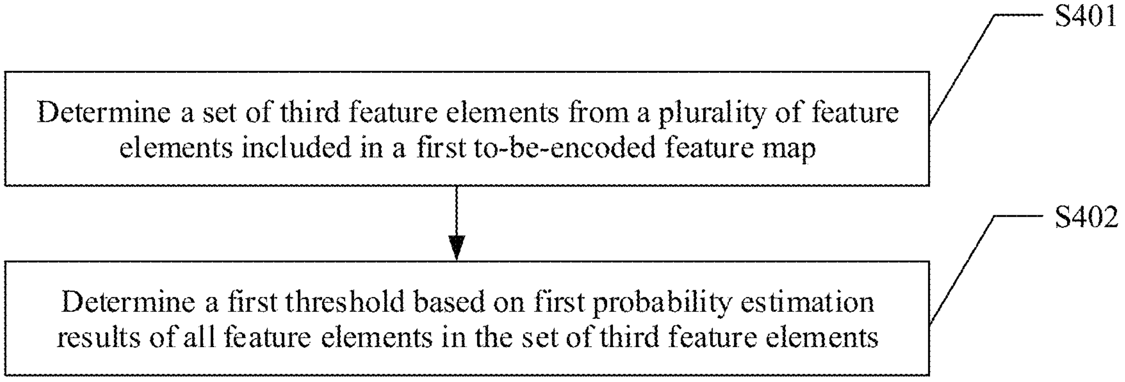
FIG. 4*c* is a schematic flowchart of a method for determining a first threshold according to an embodiment of this application.

In other words, a process of determining the first threshold may be divided into two operations. In an embodiment, a schematic flowchart of determining a first threshold is shown in FIG. 4*c*, including operations S401 and S402.

S401: Determine a set of third feature elements from a plurality of feature elements included in a first to-be-encoded feature map.

The set of third feature elements is determined from the plurality of feature elements in the first to-be-encoded feature map based on a first probability estimation result of each feature element in the first to-be-encoded feature map. The set of third feature elements may be understood as a feature element set for determining the first threshold.

In an embodiment, the set of third feature elements may be determined from the plurality of feature elements based on a preset error, a numerical value of each feature element in the first to-be-encoded feature map, and a feature value corresponding to a first peak probability of each feature element. The feature value corresponding to the first peak probability of each feature element is a possible value (or a possible numerical value) of the feature element corresponding to the first peak probability in the first probability estimation result of the feature element, for example, a horizontal coordinate numerical value a of the point P in FIG. 2*b*. The preset error value may be understood as a tolerable error in the feature map encoding method, and may be determined based on an empirical value or according to an algorithm.

In an embodiment, a feature element in the determined third feature element set has a feature shown in formula (3).

$$|\hat{y}(x, y, i) - p(x, y, i)| > \text{TH\_2} \tag{3}$$

$\hat{y}$(x, y, i) is a numerical value of the feature element $\hat{y}$[x][y][i], p(x, y, i) is a feature value corresponding to a first peak probability of the feature element $\hat{y}$[x][y][i], and TH_2 is the preset error.

For example, the plurality of feature elements included in the first to-be-encoded feature map are a feature element 1, a feature element 2, a feature element 3, a feature element 4, and a feature element 5. The first probability estimation result of each feature element in the plurality of feature elements of the first to-be-encoded feature map has been obtained via a probability estimation module. In this case, feature elements that meet the formula (3) are selected from the feature element 1, the feature element 2, the feature element 3, the feature element 4, and the feature element 5 based on the preset error e, the numerical value of each feature element, and the first peak probability (referred to as the first peak probability of the feature element for short below) of the first probability estimation result corresponding to each feature element, to form the set of third feature elements. If an absolute difference between a numerical value of the feature element 1 and a feature value of a first peak probability corresponding to the feature element 1 is greater than TH_2, the feature element 1 meets the formula (3). If an absolute difference between a numerical value of the feature element 2 and a feature value of a first peak probability corresponding to the feature element 2 is greater than TH_2, the feature element 2 meets the formula (3). If an absolute difference between a numerical value of the feature element 3 and a feature value of a first peak probability corresponding to the feature element 3 is less than TH 2, the feature element 3 does not meet the formula (3). If an absolute difference between a numerical value of the feature element 4 and a feature value of a first peak probability corresponding to the feature element 4 is equal to TH_2, the feature element 4 does not meet formula (3). If an absolute difference between a numerical value of the feature element 5 and a feature value of a first peak probability corresponding to the feature element 5 is greater than TH_2, the feature element 5 meets the formula (3). In conclusion, the feature element 1, the feature element 2, and the feature element 5 are determined to be third feature elements from the feature element 1, the feature element 2, the feature element 3, the feature element 4, and the feature element 5, to form the set of third feature elements.

S402: Determine a first threshold based on first probability estimation results of all feature elements in the set of third feature elements.

The first threshold is determined based on a form of the first probability estimation results of the feature elements in the set of third feature elements. The form of the first probability estimation results includes a Gaussian distribution or another form of a probability distribution (including but not limited to a Laplace distribution or a mixed Gaussian distribution).

The following describes a manner of determining the first threshold in detail based on the form of the first probability estimation result.

Manner 1: The first threshold is a largest first peak probability in the first peak probabilities corresponding to the feature elements in the set of third feature elements.

It should be learned that, in this manner, the form of the first probability estimation result may be the Gaussian distribution or another form of a probability distribution (including but not limited to the Laplace distribution or the mixed Gaussian distribution).

For example, the feature element 1, the feature element 2 and the feature element 5 are determined to be the third feature elements, to form the set of third feature elements. If the first peak probability of the feature element 1 is 70%, the first peak probability of the feature element 2 is 65%, and the first peak probability of the feature element 5 is 75%, a largest first peak probability (that is, the first peak probability 75% of the feature element 5) corresponding to the feature elements in the set of third feature elements is determined to be the first threshold.

Manner 2: The first probability estimation result is a Gaussian distribution, and the first probability estimation result further includes a first probability variance value. The first threshold is a smallest first probability variance value in first probability variance values corresponding to the feature elements in the set of third feature elements.

It should be learned that a mathematical feature of the Gaussian distribution may be summarized as follows: In the Gaussian distribution, a larger first probability variance value indicates a smaller first peak probability. In addition, when the first probability estimation result is the Gaussian distribution, a speed of obtaining the first probability variance value from the first probability estimation result is faster than a speed of obtaining the first peak probability from the first probability estimation result. It can be learned that when the first probability estimation result is the Gaussian distribution, efficiency of determining the first threshold based on the first probability variance value may be higher than efficiency of determining the first threshold based on the first peak probability.

For example, the feature element 1, the feature element 2 and the feature element 5 are determined to be the third feature elements, to form the set of third feature elements. If a first probability variance value $\sigma$ of the feature element 1 is 0.6, a first probability variance value $\sigma$ of the feature element 2 is 0.7, and a first probability variance value $\sigma$ of the feature element 5 is 0.5, a smallest first probability variance value $\sigma$ (that is, the probability variance value 0.5 of the feature element 5) corresponding to the feature elements in the set of third feature elements is determined to be the first threshold.

It should be known that, because the first threshold is determined based on the feature elements in the first to-be-encoded feature map, that is, the first threshold corresponds to the first to-be-encoded feature map. To facilitate data decoding, entropy encoding may be performed on the first threshold, and a result of the entropy encoding is written into an encoded bitstream of the first to-be-encoded feature map.

S305: Determine, based on the first threshold and the first probability estimation result of each feature element, whether the feature element is a first feature element.

For each of the plurality of feature elements in the first to-be-encoded feature map, whether the feature element is the first feature element may be determined based on the first threshold and the first probability estimation result of the feature element. It can be learned that an important determining condition for determining whether the feature element is the first feature element is the first threshold. The following discusses, based on the specific manners of determining the first threshold, a manner of determining whether the feature element is the first feature element.

Manner 1: When the first threshold is the largest first peak probability in the first peak probabilities corresponding to the feature elements in the set of third feature elements, the first feature element determined based on the first threshold meets the following condition: A first peak probability of the first feature element is less than or equal to the first threshold.

For example, the plurality of feature elements included in the first to-be-encoded feature map are a feature element 1, a feature element 2, a feature element 3, a feature element 4, and a feature element 5. The feature element 1, the feature element 2, and the feature element 5 form the set of third feature elements, and it is determined, based on the set of third feature elements, that the first threshold is 75%. In this case, if a first peak probability of the feature element 1 is 70% and is less than the first threshold, a first peak probability of the feature element 2 is 65% and is less than the first threshold, a first peak probability of the feature element 3 is 80% and is greater than the first threshold, a first peak probability of the feature element 4 is 60% and is less than the first threshold, and a first peak probability of the feature element 5 is 75% and is equal to the first threshold. In conclusion, the feature element 1, the feature element 2, the feature element 4, and the feature element 5 are determined to be first feature elements.

Manner 2: When the first threshold is the smallest first probability variance value in the first probability variance values corresponding to the feature elements in the set of third feature elements, the first feature element determined based on the first threshold meets the following condition: A first probability variance value of the first feature element is greater than or equal to the first threshold.

For example, the plurality of feature elements included in the first to-be-encoded feature map are a feature element 1, a feature element 2, a feature element 3, a feature element 4, and a feature element 5. The feature element 1, the feature element 2, and the feature element 5 form the set of third feature elements, and it is determined, based on the set of third feature elements, that the first threshold is 0.5. In this case, if a first peak probability of the feature element 1 is 0.6 and is greater than the first threshold, a first peak probability of the feature element 2 is 0.7 and is greater than the first threshold, a first peak probability of the feature element 3 is 0.4 and is less than the first threshold, a first peak probability of the feature element 4 is 0.75 and is greater than the first threshold, and a first peak probability of the feature element 5 is 0.5 and is equal to the first threshold. In conclusion, the feature element 1, the feature element 2, the feature element 4, and the feature element 5 are determined to be first feature elements.

S306: Perform entropy encoding on the first feature element only when the feature element is the first feature element.

Each feature element in the first to-be-encoded feature map is determined, and whether the feature element is the first feature element is determined. If the feature element is the first feature element, the first feature element is encoded, and an encoding result of the first feature element is written into the encoded bitstream. In other words, it may be understood that entropy encoding is performed on all first feature elements in the feature map, and entropy encoding results of all the first feature elements are written into the encoded bitstream.

For example, the plurality of feature elements included in the first to-be-encoded feature map are a feature element 1, a feature element 2, a feature element 3, a feature element 4, and a feature element 5. The feature element 1, the feature element 2, the feature element 4, and the feature element 5 are determined to be first feature elements. In this case, entropy encoding is not performed on the feature element 3, but on the feature element 1, the feature element 2, the feature element 4, and the feature element 5, and the entropy encoding results of all the first feature elements are written into the encoded bitstream.

It should be noted that if a determining result of each feature element in S305 is that the feature element is not the first feature element, entropy encoding is performed on none of the feature elements. If a determining result of each feature element in S305 is that the feature element is the first feature element, entropy encoding is performed on each feature element, and an entropy encoding result of each feature element is written into the encoded bitstream.

In an embodiment, entropy encoding may be further performed on side information of the first to-be-encoded feature map, and an entropy encoding result of the side information is written into the bitstream. Alternatively, the side information of the first to-be-encoded feature map may be sent to a decoder side, to facilitate subsequent data decoding.

Figure 5:
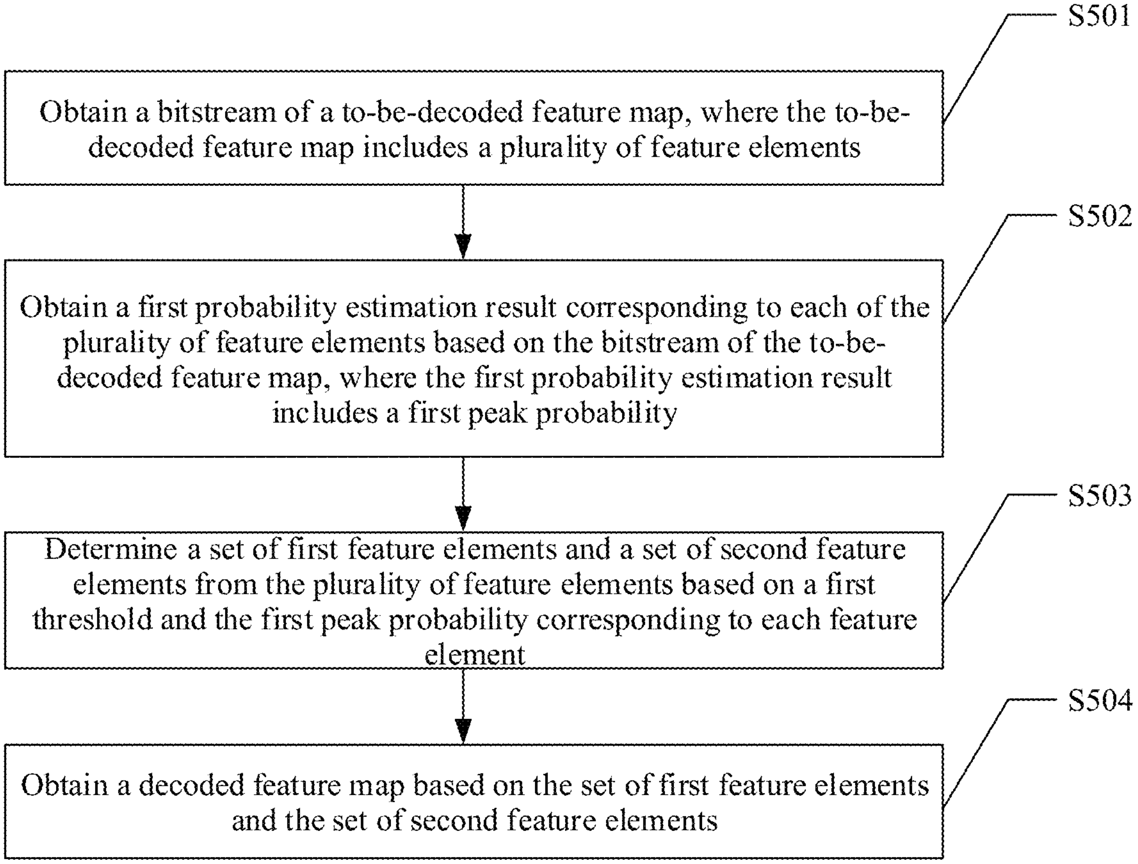
FIG. 5 is a schematic flowchart of a feature map decoding method according to an embodiment of this application.

Decoder side: FIG. 5 is a schematic flowchart of a feature map decoding method according to an embodiment of this application. A procedure of the feature map decoding method includes S501 to S504.

S501: Obtain a bitstream of a to-be-decoded feature map, where the to-be-decoded feature map includes a plurality of feature elements.

The bitstream of the to-be-decoded feature map may be understood as an encoded bitstream obtained in S306. The to-be-decoded feature map is a feature map obtained after data decoding is performed on the bitstream. The to-be-decoded feature map includes the plurality of feature elements. The plurality of feature elements are divided into two parts: a set of first feature elements and a set of second feature elements. The set of first feature elements is a set of feature elements on which entropy encoding is performed in the feature map encoding phase in FIG. 3. The set of second feature elements is a set of feature elements on which entropy encoding is not performed in the feature map encoding phase in FIG. 3.

In an embodiment, the set of first feature elements is an empty set, or the set of second feature elements is an empty set. The set of first feature elements is the empty set, that is, in the feature map encoding phase in FIG. 3, entropy encoding is performed on none of the feature elements. The set of second feature elements is the empty set, that is, in the feature map encoding phase in FIG. 3, entropy encoding is performed on each feature element.

S502: Obtain a first probability estimation result corresponding to each of the plurality of feature elements based on the bitstream of the to-be-decoded feature map, where the first probability estimation result includes a first peak probability.

Entropy decoding is performed on the bitstream of the to-be-decoded feature map. Further, the first probability estimation result corresponding to each of the plurality of feature elements may be obtained based on an entropy decoding result. The first probability estimation result includes the first peak probability.

In an embodiment, side information corresponding to the to-be-decoded feature map is obtained based on the bitstream of the to-be-decoded feature map. The first probability estimation result corresponding to each feature element is obtained based on the side information.

In an embodiment, the bitstream of the to-be-decoded feature map includes an entropy encoding result of the side information. Therefore, entropy decoding may be performed on the bitstream of the to-be-decoded feature map, and an obtained entropy decoding result includes the side information corresponding to the to-be-decoded feature map. Further, as shown in FIG. 4*a*, the side information is used as an input into the probability estimation module 103 in FIG. 1, and an output from the probability estimation module 103 is the first probability estimation result of each feature element (including the feature elements in the set of first feature elements and the feature elements in the set of second feature elements).

For example, for a first probability estimation result of a feature element, refer to FIG. 2*b*. The horizontal axis indicates each possible value (or referred to as each possible numerical value) of the feature element $\hat{y}[x][y][i]$, and the vertical axis indicates a possibility of each possible value (or referred to as each possible numerical value). The first peak probability is a largest probability in the first probability estimation result, and may also be referred to as a probability peak in the first probability estimation result. As shown in FIG. 2*b*, a numerical value p on a vertical coordinate of a point P is the first peak probability in the first probability estimation result. It should be learned that the first probability estimation result is a Gaussian distribution, and the first peak probability is a mean probability of the Gaussian distribution. Alternatively, the first probability estimation result is a mixed Gaussian distribution. The mixed Gaussian distribution includes a plurality of Gaussian distributions. The first peak probability is a largest value in mean probabilities of the Gaussian distributions, or the first peak probability is calculated based on mean probabilities of the Gaussian distributions and weights of the Gaussian distributions in the mixed Gaussian distribution. For an embodiment of obtaining the first peak probability based on the first probability estimation result, refer to related descriptions of the first probability estimation result and the first peak probability in S303. Repeated content is not described again.

The probability estimation module 103 may be the probability estimation network, and the probability estimation network may use the RNN, the CNN, the variant of the RNN, the variant of the CNN, or another deep neural network (or the variant of another deep neural network). FIG. 4*b* is the schematic diagram of the structure of the probability estimation network. In FIG. 4*b*, the probability estimation network is the convolutional network, and the convolutional network includes the five network layers: the three convolutional layers and the two non-linear activation layers. The probability estimation module 103 may alternatively be implemented according to the non-network conventional probability estimation method. The probability estimation method includes but is not limited to the statistical methods such as the maximum likelihood estimation, the maximum a posteriori estimation, and the maximum likelihood estimation.

S503: Determine the set of first feature elements and the set of second feature elements from the plurality of feature elements based on a first threshold and the first peak probability corresponding to each feature element.

The set of first feature elements and the set of second feature elements are determined from the plurality of feature elements in the to-be-decoded feature map based on a numerical relationship between the first threshold and the first peak probability corresponding to each feature element. The first threshold may be determined through negotiation between a device corresponding to the feature map encoding method and a device corresponding to the feature map decoding method, or may be set based on an empirical value. Alternatively, the first threshold may be obtained based on the bitstream of the to-be-decoded feature map.

In an embodiment, the first threshold may be the largest first peak probability in the set of third feature elements in the manner 1 in S402. In this case, for each feature element in the to-be-decoded feature map, if the first peak probability of the feature element is greater than the first threshold, the feature element is determined to be a second feature element (that is, a feature element in the set of second feature elements). Alternatively, if the first peak probability of the feature element is less than or equal to (including less than or less than and equal to) the first threshold, the feature element is determined to be the first feature element (that is, a feature element in the set of first feature elements).

For example, the first threshold is 75%, and the plurality of feature elements of the to-be-decoded feature map are a feature element 1, a feature element 2, a feature element 3, a feature element 4, and a feature element 5. A first peak probability of the feature element 1 is 70% and is less than the first threshold, a first peak probability of the feature element 2 is 65% and is less than the first threshold, a first peak probability of the feature element 3 is 80% and is greater than the first threshold, a first peak probability of the feature element 4 is 60% and is less than the first threshold, and a first peak probability of the feature element 5 is 75% and is equal to the first threshold. In conclusion, the feature element 1, the feature element 2, the feature element 4, and the feature element 5 are determined to be first feature elements. In conclusion, the feature element 1, the feature element 2, the feature element 4, and the feature element 5 are determined to be feature elements in the set of first feature elements, and the feature element 3 is determined to be a feature element in the set of second feature elements.

In a case, a form the first probability estimation result is a Gaussian distribution, and the first probability estimation result further includes a first probability variance value. In this case, an embodiment of S503 is determining the set of first feature elements and the set of second feature elements from the plurality of feature elements based on the first threshold and the first probability variance value of each feature element. In an embodiment, the first threshold may be the smallest first probability variance value in the set of third feature elements in the manner 2 in S402. Further, for each feature element in the to-be-decoded feature map, if a first probability variance value of the feature element is less than the first threshold, the feature element is determined to be a second feature element (that is, a feature element in the set of second feature elements). If the first probability variance value of the feature element is greater than or equal to the first threshold, the feature element is determined to be a first feature element (that is, a feature element in the set of first feature elements).

For example, the first threshold is 0.5, and a plurality of feature elements included in a first to-be-encoded feature map are a feature element 1, a feature element 2, a feature element 3, a feature element 4, and a feature element 5. A first peak probability of the feature element 1 is 0.6 and is greater than the first threshold, a first peak probability of the feature element 2 is 0.7 and is greater than the first threshold, a first peak probability of the feature element 3 is 0.4 and is less than the first threshold, a first peak probability of the feature element 4 is 0.75 and is greater than the first threshold, and a first peak probability of the feature element 5 is 0.5 and is equal to the first threshold. In conclusion, the feature element 1, the feature element 2, the feature element 4, and the feature element 5 are determined to be feature elements in the set of first feature elements, and the feature element 3 is determined to be a feature element in the set of second feature elements.

S504: Obtain a decoded feature map based on the set of first feature elements and the set of second feature elements.

In other words, a value of the decoded feature map is obtained based on a numerical value of each feature element in the set of first feature elements and the first probability estimation result of each feature element in the set of second feature elements.

In an embodiment, entropy decoding is performed on the first probability estimation result corresponding to the first feature element, to obtain a numerical value of the first feature element (which is understood as a general term of a feature element in the set of first feature elements). The first probability estimation result includes the first peak probability and a feature value corresponding to the first peak probability. Further, a numerical value of the second feature element is obtained based on a feature value corresponding to a first peak probability of the second feature element (which is understood as a general term of a feature element in the set of second feature elements). In other words, it may be understood that entropy decoding is performed on first probability estimation results corresponding to all feature elements in the set of first feature elements, to obtain numerical values of all feature elements in the set of first feature elements. Numerical values of all feature elements in the set of second feature elements are obtained based on feature values corresponding to first peak probabilities of all feature elements in second feature elements, and entropy decoding does not need to be performed on any feature element in the set of second feature elements.

For example, data decoding is performed on the to-be-decoded feature map, that is, a numerical value of each feature element is to be obtained. The plurality of feature elements in the to-be-decoded feature map are a feature element 1, a feature element 2, a feature element 3, a feature element 4, and a feature element 5. The feature element 1, the feature element 2, the feature element 4, and the feature element 5 are determined to be feature elements in the set of first feature elements, and the feature element 3 is determined to be a feature element in the set of second feature elements. Further, the bitstream and the first probability estimation results corresponding to the first feature elements are used as inputs, and are input into the data decoding module 104 shown in FIG. 1, to obtain a numerical value of the feature element 1, a numerical value of the feature element 2, a numerical value of the feature element 4, and a numerical value of the feature element 5. A feature value corresponding to a first peak probability in a first probability estimation result of the feature element 3 is determined to be the numerical value of the feature element 3 in the to-be-decoded feature map. In this way, the numerical value of the feature element 1, the numerical value of the feature element 2, the numerical value of the feature element 3, the numerical value of the feature element 4, and the numerical value of the feature element 5 are combined into a value of the to-be-decoded feature map.

It should be noted that, if the set of first feature elements is an empty set (that is, entropy encoding is performed on none of the feature elements), the value of the decoded feature map may be obtained based on the first probability estimation result (herein indicating the feature value corresponding to the first peak probability in the first probability estimation result) of each feature element. If the set of second feature elements is an empty set (that is, entropy encoding is performed on each feature element), entropy decoding is performed on the first probability estimation result corresponding to each feature element, to obtain the value of the decoded feature map.

Compared with determining, based on a probability corresponding to a fixed value in a probability estimation result corresponding to each feature element, whether encoding needs to be performed on the feature element, a method provided in FIG. 3 for determining, based on a peak probability of a probability estimation result corresponding to a feature element, whether an entropy encoding process needs to be skipped for the feature element can improve reliability of a determining result (whether entropy encoding needs to be performed on the feature element), and can significantly reduce a quantity of elements for performing entropy encoding and reduce complexity of entropy encoding. In addition, reliability of using the feature value of the first probability peak of the feature element (that is, the second feature element) on which entropy encoding is not performed as the numerical value of the second feature element to form the value of the to-be-decoded feature map as shown in FIG. 5 is better than that of replacing a numerical value of a second feature element with a fixed value to form a value of a to-be-decoded feature map in the conventional technology, thereby further improving data decoding accuracy and performance of the data encoding and decoding method.

Figure 6A:
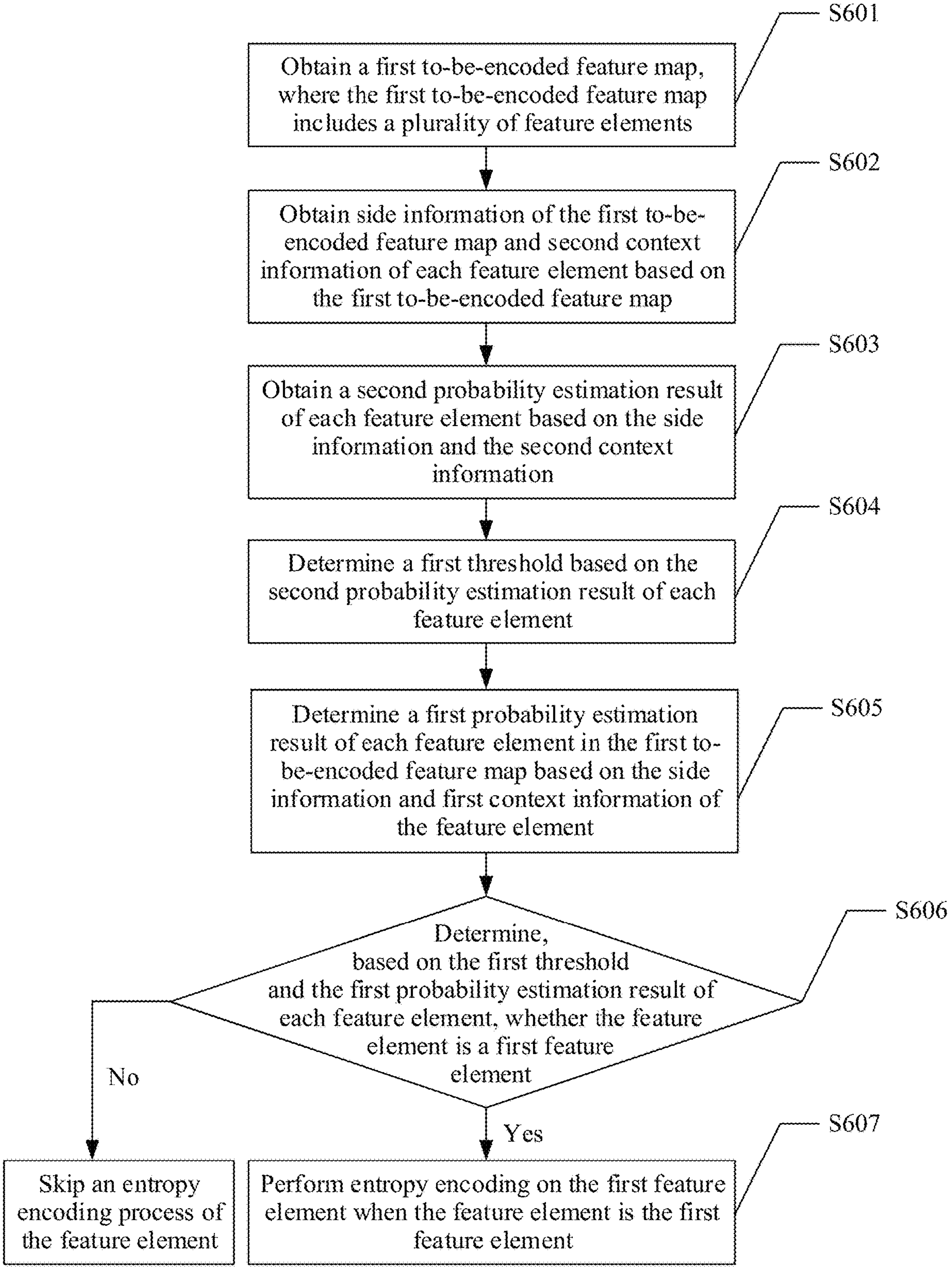
FIG. 6*a* is a schematic flowchart of another feature map encoding method according to an embodiment of this application.

Encoder side: FIG. 6*a* is a schematic flowchart of another feature map encoding method according to an embodiment of this application. A procedure of the feature map encoding method includes S601 to S607.

S601: Obtain a first to-be-encoded feature map, where the first to-be-encoded feature map includes a plurality of feature elements.

For an embodiment of S601, refer to the description of the embodiment of S301. Details are not described herein again.

S602: Obtain side information of the first to-be-encoded feature map and second context information of each feature element based on the first to-be-encoded feature map.

For an embodiment of obtaining the side information of the first to-be-encoded feature map, refer to the description of the embodiment of S302. Details are not described herein again.

A manner of obtaining the second context may be: obtaining the second context information from the first to-be-encoded feature map via a network module, where the network module may be an RNN or a network variant of the RNN. The second context information may be understood as a feature element (or a numerical value of the feature element) that is of the feature element and that is in a preset region range in the first to-be-encoded feature map.

S603: Obtain a second probability estimation result of each feature element based on the side information and the second context information.

Figure 6B:
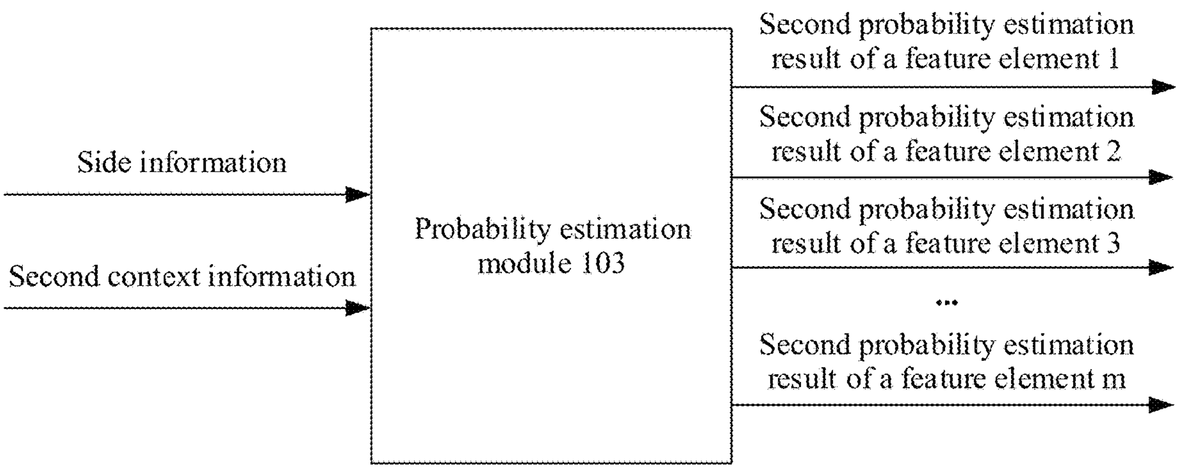
FIG. 6*b* is a schematic diagram of input and output results of another probability estimation module 103 according to an embodiment of this application.

As shown in FIG. 6*b*, the side information and the second context information are used as inputs into the probability estimation module 103 in FIG. 1, and an output from the probability estimation module 103 is the second probability estimation result of each feature element. For a specific description of the probability estimation module 103, refer to S303. A form of the second probability estimation result includes a Gaussian distribution or another form of a probability distribution (including but not limited to a Laplace distribution or a mixed Gaussian distribution). A schematic diagram of a second probability estimate result of a feature element is the same as the schematic diagram of the first probability estimate result shown in FIG. 2*b*. Details are not described herein again.

S604: Determine a first threshold based on the second probability estimate result of each feature element.

In an embodiment, a set of third feature elements is determined from the plurality of feature elements in the first to-be-encoded feature map based on the second probability estimation result of each feature element in the first to-be-encoded feature map. Further, the first threshold is determined based on second probability estimation results of all feature elements in the set of third feature elements. In an embodiment, for a specific manner of determining the first threshold based on the second probability estimation result of each feature element in the set of third feature elements, refer to the specific manner of determining the first threshold based on the first probability estimation result of each feature element in the set of third feature elements shown in FIG. 4*c*. Details are not described herein again.

S605: Determine a first probability estimation result of each feature element in the first to-be-encoded feature map based on the side information and first context information of the feature element.

The first context information is a feature element that corresponds to the feature element and that is in a preset region range in the second to-be-encoded feature map, a value of the second to-be-encoded feature map includes a numerical value of a first feature element and a feature value corresponding to a first peak probability of a second feature element, and the second feature element is a feature element other than the first feature element in the first to-be-encoded feature map. It should be understood that a quantity of feature elements included in the first to-be-encoded feature map is the same as a quantity of feature elements included in the second to-be-encoded feature map, a value of the first to-be-encoded feature map is different from a value of the second to-be-encoded feature map, and the second to-be-encoded feature map may be understood as a feature map (that is, a to-be-decoded feature map in this application) obtained after the first to-be-encoded feature map is decoded. The first context information describes a relationship between feature elements in the second to-be-encoded feature map, and the second context information describes a relationship between feature elements in the first to-be-encoded feature map.

For example, the feature elements included in the first to-be-encoded feature map are a feature element 1, a feature element 2, a feature element 3, . . . , and a feature element m. After the first threshold is obtained based on the specific description manner of S604, alternative probability estimation and entropy encoding are performed on the feature element 1, the feature element 2, the feature element 3, the feature element 4, and the feature element 5. In other words, it may be understood that probability estimation and entropy encoding are first performed on the feature element 1. Because the feature element 1 is a first feature element for which entropy encoding is performed, first context information of the feature element 1 is empty. In this case, only probability estimation needs to be performed on the feature element 1 based on the side information, to obtain a first probability estimation result corresponding to the feature element 1. Further, whether the feature element 1 is the first feature element is determined based on the first probability estimation result and the first threshold, entropy encoding is performed on the feature element 1 only when the feature element 1 is the first feature element, and a numerical value of the feature element 1 in the second to-be-encoded feature map is determined. Next, for the feature element 2, a first probability estimation result of the feature element 2 is estimated based on the side information and the first context information (which may be understood as a numerical value of the first feature element in the second to-be-encoded feature map in this case). Further, whether the feature element 2 is the first feature element is determined based on the first probability estimation result and the first threshold, entropy encoding is performed on the feature element 2 only when the feature element 2 is the first feature element, and a numerical value of the feature element 2 in the second to-be-encoded feature map is determined. Then, for the feature element 3, a first probability estimation result of the feature element 3 is estimated based on the side information and the first context information (which may be understood as a numerical value of the first feature element in the second to-be-encoded feature map and a numerical value of the second feature element in the second to-be-encoded feature map in this case). Further, whether the feature element 3 is the first feature element is determined based on the first probability estimation result and the first threshold, entropy encoding is performed on the feature element 3 only when the feature element 3 is the first feature element, and a numerical value of the feature element 3 in the second to-be-encoded feature map is determined. The rest may be deduced by analogy until probabilities of all feature elements in the first to-be-encoded feature map are estimated.

S606: Determine, based on the first probability estimation result of the feature element and the first threshold, whether the feature element is the first feature element.

S607: Perform entropy encoding on the first feature element only when the feature element is the first feature element.

For an embodiment of S606 and S607, refer to the description of the embodiment of S305 and S306. Details are not described herein again.

It should be understood that, for any feature element in the feature map, a probability estimation result for determining whether the feature element is a first feature element (that is, a feature element that needs entropy encoding) is denoted as a first probability estimation result of the feature element, and a probability estimate result for determining a first threshold is denoted as a second probability estimation result. In the feature map encoding method shown in FIG. 6*a*, a first probability estimation result of a feature element is different from a second probability estimation result of the feature element. However, in the feature map encoding method shown in FIG. 3, because no context feature is introduced for probability estimation, the first probability estimation result of the feature element is the same as the second probability estimation result of the feature element.

Figure 7A:
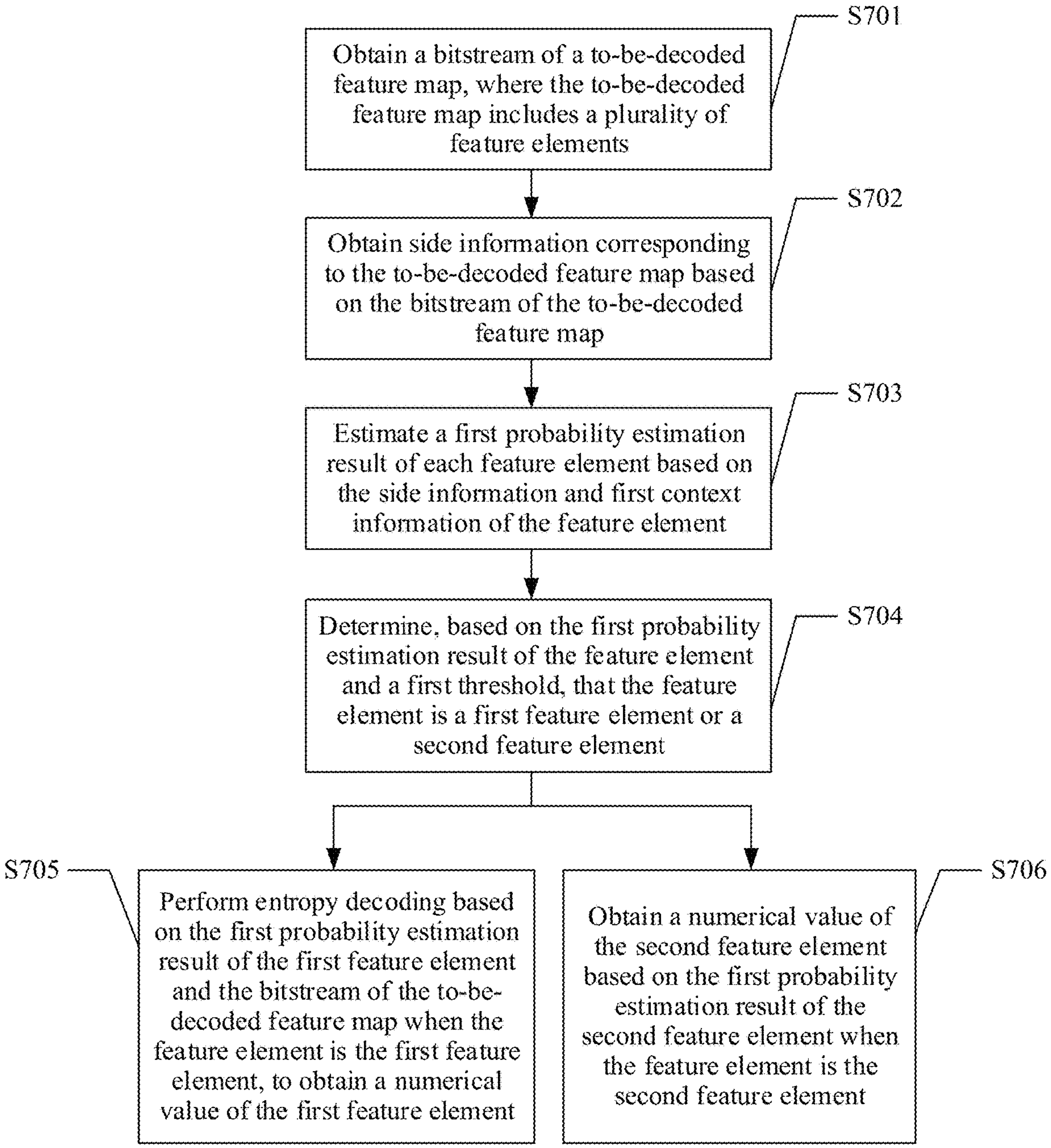
FIG. 7*a* is a schematic flowchart of another feature map decoding method according to an embodiment of this application.

Decoder side: FIG. 7*a* is a schematic flowchart of a feature map decoding method according to an embodiment of this application. A procedure of the feature map decoding method includes S701 to S706.

S701: Obtain a bitstream of a to-be-decoded feature map, where the to-be-decoded feature map includes a plurality of feature elements.

For an embodiment of S701, refer to the description of the embodiment of S501. Details are not described herein again.

S702: Obtain side information corresponding to the to-be-decoded feature map based on the bitstream of the to-be-decoded feature map.

In an embodiment, side information corresponding to the to-be-decoded feature map is obtained based on the bitstream of the to-be-decoded feature map. The first probability estimation result corresponding to each feature element is obtained based on the side information.

In an embodiment, the bitstream of the to-be-decoded feature map includes an entropy encoding result of the side information. Therefore, entropy decoding may be performed on the bitstream of the to-be-decoded feature map, and an obtained entropy decoding result includes the side information corresponding to the to-be-decoded feature map.

S703: Estimate the first probability estimation result of each feature element based on the side information and first context information of the feature element.

The first context information is a feature element that corresponds to the feature element and that is in a preset region range in the to-be-decoded feature map (that is, the second to-be-encoded feature map in S605). It should be known that, in this case, probability estimation and entropy decoding are sequentially and alternately performed on feature elements in the to-be-decoded feature map.

For example, the feature elements in the to-be-decoded feature map are a feature element 1, a feature element 2, a feature element 3, . . . , and a feature element m. First, probability estimation and entropy decoding are performed on the feature element 1. Because the feature element 1 is the first feature element for which entropy decoding is performed, first context information of the feature element 1 is empty. In this case, only probability estimation needs to be performed on the feature element 1 based on the side information, to obtain a first probability estimation result corresponding to the feature element 1. Further, it is determined that the feature element 1 is a first feature element or a second feature element, and a numerical value of the feature element 1 in the to-be-decoded feature map is determined based on a determining result. Next, for the feature element 2, a first probability estimation result of the feature element 2 is estimated based on the side information and the first context information (which may be understood as a numerical value of the first feature element in the to-be-decoded feature map in this case). Further, whether the feature element 2 is a first feature element or a second feature element is determined. A numerical value of the feature element 2 in the to-be-decoded feature map is determined based on a determining result. Then, for the feature element 3, a first probability estimation result of the feature element 3 is estimated based on the side information and the first context information (which may be understood as the numerical value of the first feature element in the to-be-decoded feature map and a numerical value of the second feature element in the to-be-decoded feature map in this case). Further, it is determined that the feature element 3 is the first feature element or the second feature element. A numerical value of the feature element 3 in the to-be-decoded feature map is determined based on a determining result. The rest may be deduced by analogy until probabilities of all feature elements are estimated.

S704: Determine, based on the first probability estimation result of the feature element and a first threshold, that the feature element is a first feature element or a second feature element.

For an embodiment of S704, refer to the description of the embodiment of S503. Details are not described herein again.

S705: Perform entropy decoding based on the first probability estimation result of the first feature element and the bitstream of the to-be-decoded feature map when the feature element is the first feature element, to obtain a numerical value of the first feature element.

If a determining result of the feature element is that the feature element is the first feature element, entropy decoding is performed on the first feature element based on the first probability estimation result of the first feature element, to obtain a numerical value of the first feature element in the decoded feature map. The numerical value of the first feature element in the decoded feature map is the same as a numerical value of the first feature element in a to-be-encoded feature map.

S706: Obtain a numerical value of the second feature element based on a first probability estimation result of the second feature element when the feature element is the second feature element.

If a determining result for the feature element is that the feature element is the second feature element, a feature value corresponding to the first peak probability of the second feature element is determined to be the numerical value of the second feature element. In other words, entropy decoding does not need to be performed on the second feature element, and the numerical value of the second feature element in the decoded feature map may be the same as or different from a numerical value of the second feature element in a to-be-encoded feature map. A value of the decoded feature map is determined based on both numerical values of all second feature elements and numerical values of all first feature elements, to obtain the decoded feature map.

Compared with the feature map encoding method provided in FIG. 3, in the feature map encoding method provided in FIG. 6*a*, probability estimation is performed with reference to context information, thereby improving accuracy of a probability estimation result corresponding to each feature element, increasing a quantity of feature elements on which encoding processes are skipped, and further improving data encoding efficiency. Compared with the feature map decoding method provided in FIG. 5, in the feature map decoding method provided in FIG. 7*a*, probability estimation is performed with reference to context information, thereby improving accuracy of a probability estimation result corresponding to each feature element, improving reliability of a feature element (that is, a second feature element) on which entropy encoding is not performed in a to-be-decoded feature map, and improving data decoding performance.

The applicant denotes a feature map encoding and decoding method without skipping encoding (that is, when entropy encoding is performed on a to-be-encoded feature map, entropy encoding processes are performed on all feature elements in the to-be-encoded feature map) as a baseline method, and performs a comparison experiment between the feature map encoding and decoding methods (denoted as feature map encoding and decoding methods with skipping based on dynamic peaks) provided in FIG. 6*a* and FIG. 7*a* and a method for feature map encoding with feature elements skipped based on a probability corresponding to a fixed value in a probability estimation result corresponding to each feature element (denoted as feature map encoding and decoding methods with skipping based on fixed peaks).

For a result of the comparison experiment, refer to Table 1. Compared with the baseline method, in the feature map decoding method with skipping based on fixed peaks, an amount of data for obtaining same image quality is reduced by 0.11%, and in this solution, an amount of data for obtaining same image quality is reduced by 1%.

TABLE 1

| Method | Reduced data amount |
|---|---|
| Baseline method | 0% |
| Feature map decoding method with skipping based on fixed peaks | −0.11% |
| Feature map decoding method with skipping based on dynamic peaks | −1% |

It can be learned that, when decoded image quality is ensured, the technical method provided in this application can reduce a larger amount of data, and improve the data compression performance (including but not limited to a compression ratio).

Figure 7B:
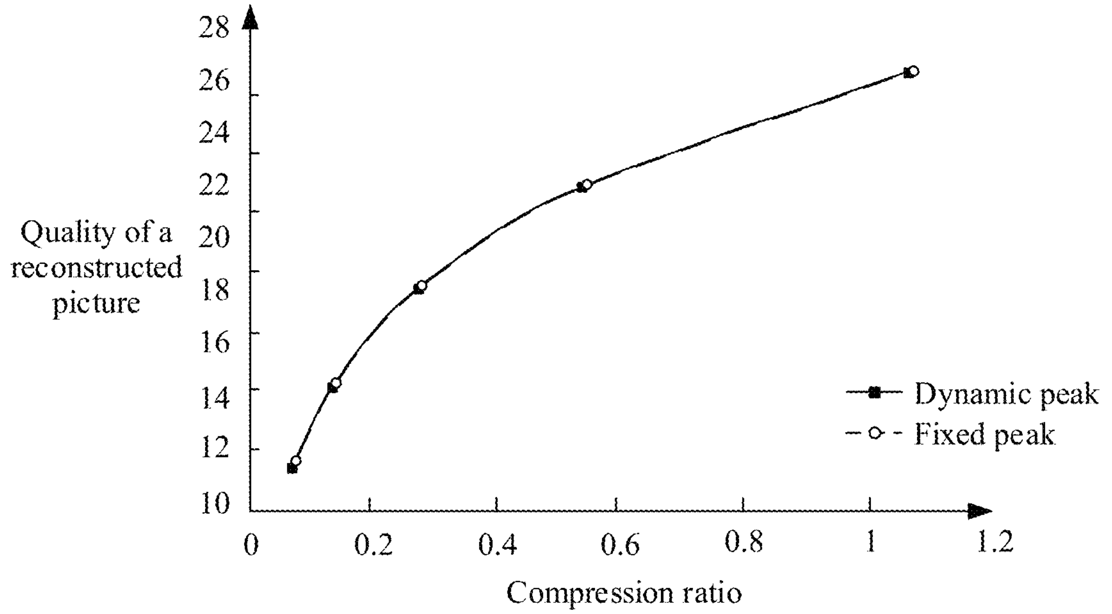
FIG. 7*b* is a schematic diagram of an experiment result of a compression performance comparison test according to an embodiment of this application.
Figure 7C:
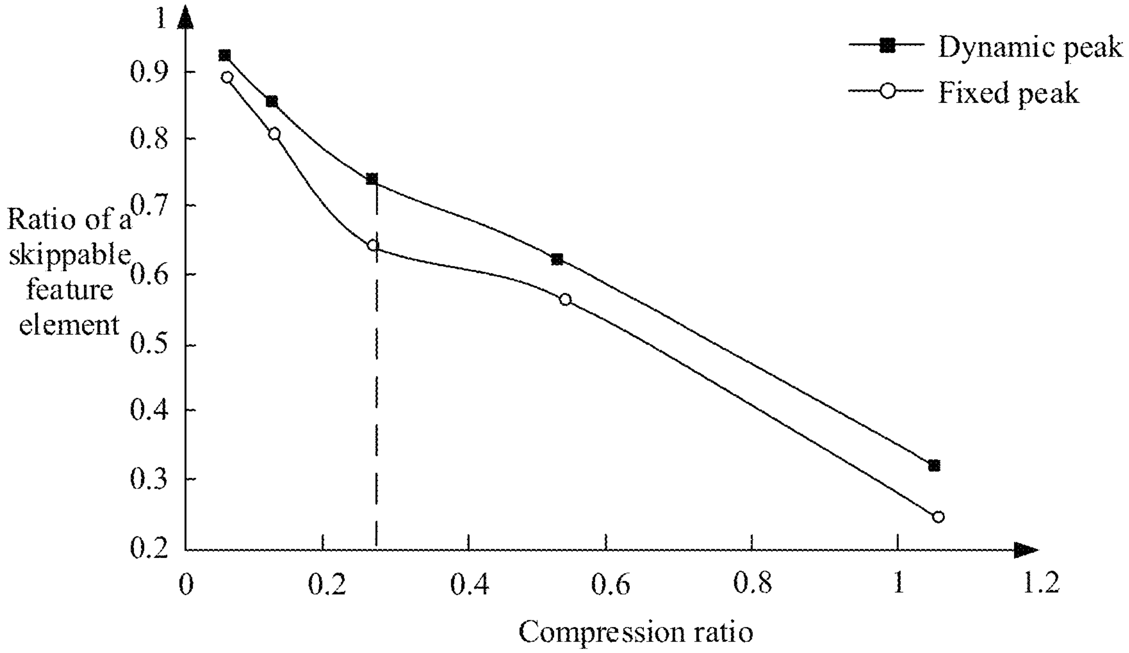
FIG. 7*c* is a schematic diagram of an experiment result of another compression performance comparison test according to an embodiment of this application.

The applicant further performs a comparison experiment between the feature map encoding and decoding methods provided in FIG. 6*a* and FIG. 7*a* and the feature map encoding and decoding methods with skipping based on fixed peaks. Comparison experiment result diagrams are shown in FIG. 7*b* and FIG. 7*c*. In FIG. 7*b*, a vertical axis may be understood as quality of a reconstructed image, and a horizontal axis is an image compression ratio. Usually, as the image compression ratio increases, the quality of the reconstructed image becomes better. It can be seen from FIG. 7*b* that, a curve of the feature map encoding and decoding method (that is, marked as a dynamic peak in FIG. 7*b*) with skipping based on dynamic peaks almost overlap with a curve of the feature map encoding method (that is, marked as a fixed peak in FIG. 7*b*) with skipping based on fixed peaks. In other words, when reconstructed picture image quality (that is, numerical values of vertical coordinates are the same) is the same, the feature map encoding and decoding method (that is, marked as the dynamic peak in FIG. 7*b*) with skipping based on dynamic peaks is slightly better than the feature map encoding method (that is, marked as the fixed peak in FIG. 7*b*) with skipping based on fixed peaks. In FIG. 7*c*, a vertical axis is a ratio of a skippable feature element, and a horizontal axis is an image compression ratio. Usually, as the image compression ratio increases, ratios of skippable feature elements gradually decrease. It can be seen from FIG. 7*c* that a curve of the feature map encoding and decoding method (that is, marked as the dynamic peak in FIG. 7*c*) with skipping based on dynamic peaks is above a curve of the feature map encoding method (that is, marked as the fixed peak in FIG. 7*c*) with skipping based on fixed peaks. In other words, when image compression ratios (that is, numerical values of horizontal coordinates are the same) are the same, feature elements on which encoding processes can be skipped in the feature map encoding and decoding method (that is, marked as the dynamic peak in FIG. 7*c*) with skipping based on dynamic peaks are more than those in the feature map encoding method (that is, marked as the fixed peak in FIG. 7*c*) with skipping based on fixed peaks.

Figure 8:
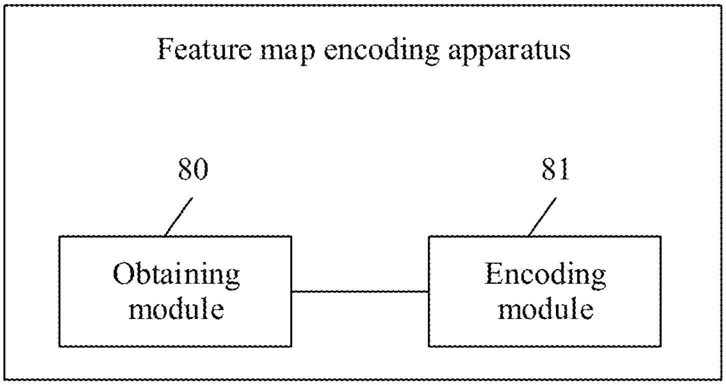
FIG. 8 is a schematic diagram of a structure of a feature map encoding apparatus according to an embodiment of this application.

FIG. 8 is a schematic diagram of a structure of a feature map encoding apparatus according to this application. The feature map encoding apparatus may be an integration of the probability estimation module 103 and the data encoding module 104 in FIG. 1. The apparatus includes:

an obtaining module 80, configured to obtain a first to-be-encoded feature map, where the first to-be-encoded feature map includes a plurality of feature elements; and an encoding module 81, configured to:

determine a first probability estimation result of each of the plurality of feature elements based on the first to-be-encoded feature map, where the first probability estimation result includes a first peak probability; determine, based on the first peak probability of each feature element in the first to-be-encoded feature map, whether the feature element is a first feature element; and perform entropy encoding on the first feature element only when the feature element is the first feature element.

In an embodiment, the first probability estimation result is a Gaussian distribution, and the first peak probability is a mean probability of the Gaussian distribution.

Alternatively, the first probability estimation result is a mixed Gaussian distribution. The mixed Gaussian distribution includes a plurality of Gaussian distributions. The first peak probability is a largest value in mean probabilities of the Gaussian distributions, or the first peak probability is calculated based on mean probabilities of the Gaussian distributions and weights of the Gaussian distributions in the mixed Gaussian distribution.

In an embodiment, the encoding module 81 is configured to determine, based on a first threshold and the first peak probability of the feature element, whether the feature element is the first feature element.

In an embodiment, the encoding module 81 is further configured to: determine a second probability estimation result of each of the plurality of feature elements based on the first to-be-encoded feature map, where the second probability estimation result includes a second peak probability; determine a set of third feature elements from the plurality of feature elements based on the second probability estimation result of each feature element; determine the first threshold based on second peak probabilities of all feature elements in the set of third feature elements; and perform entropy encoding on the first threshold.

In an embodiment, the first threshold is a largest second peak probability in the second peak probabilities corresponding to the feature elements in the set of third feature elements.

In an embodiment, a first peak probability of the first feature element is less than or equal to the first threshold.

In an embodiment, the second probability estimation result is a Gaussian distribution, and the second probability estimation result further includes a second probability variance value. The first threshold is a smallest second probability variance value in second probability variance values corresponding to the feature elements in the set of third feature elements.

In an embodiment, the first probability estimation result is the Gaussian distribution, and the first probability estimation result further includes a first probability variance value. The first probability variance value of the first feature element is greater than or equal to the first threshold.

In an embodiment, the second probability estimation result further includes a feature value corresponding to the second peak probability. The encoding module 81 is configured to determine the set of third feature elements from the plurality of feature elements based on a preset error, a numerical value of each feature element, and the feature value corresponding to the second peak probability of each feature element.

In an embodiment, a feature element in the set of third feature elements has the following feature: $|\hat{y}(x, y, i)-p(x, y, i)>TH\_2$. $\hat{y}(x, y, i)$ is the feature element. $p(x,y,i)$ is a feature value corresponding to a second peak probability of the feature element. $TH_2$ is the preset error.

In an embodiment, the first probability estimation result is the same as the second probability estimation result. The encoding module 81 is configured to: obtain side information of the first to-be-encoded feature map based on the first to-be-encoded feature map; and perform probability estimation on the side information to obtain the first probability estimation result of each feature element.

In an embodiment, the first probability estimation result is different from the second probability estimation result. The encoding module 81 is configured to: obtain side information of the first to-be-encoded feature map and second context information of each feature element based on the first to-be-encoded feature map, where the second context information is a feature element that corresponds to the feature element and that is in a preset region range in the first to-be-encoded feature map; and obtain the second probability estimation result of each feature element based on the side information and the second context information.

In an embodiment, the encoding module 81 is configured to: obtain the side information of the first to-be-encoded feature map based on the first to-be-encoded feature map; and determine, for any feature element in the first to-be-encoded feature map, a first probability estimation result of the feature element based on first context information and the side information. The first probability estimation result further includes a feature value corresponding to the first probability peak. The first context information is a feature element that corresponds to the feature element and that is in a preset region range in a second to-be-encoded feature map. A value of the second to-be-encoded feature map includes a numerical value of the first feature element and a feature value corresponding to a first peak probability of a second feature element. The second feature element is a feature element other than the first feature element in the first to-be-encoded feature map.

In an embodiment, the encoding module 81 is further configured to write entropy encoding results of all first feature elements into an encoded bitstream.

Figure 9:
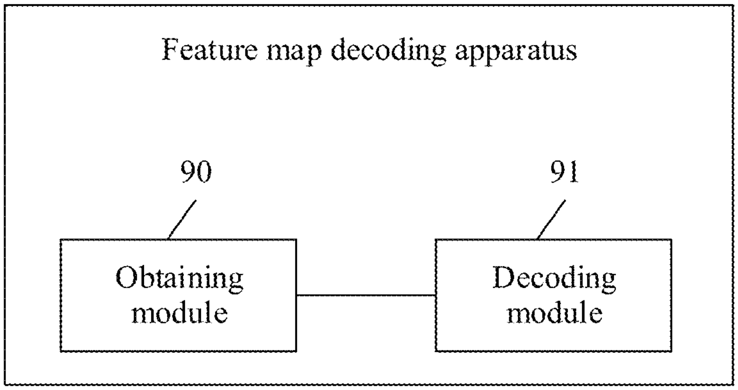
FIG. 9 is a schematic diagram of a structure of a feature map decoding apparatus according to an embodiment of this application.

FIG. 9 is a schematic diagram of a structure of a feature map decoding apparatus according to this application. The feature map decoding apparatus may be an integration of the probability estimation module 103 and the data decoding module 105 in FIG. 1. The feature map decoding apparatus includes:

an obtaining module 90, configured to: obtain a bitstream of a to-be-decoded feature map, where the to-be-decoded feature map includes a plurality of feature elements; and obtain a first probability estimation result corresponding to each of the plurality of feature elements based on the bitstream of the to-be-decoded feature map, where the first probability estimation result includes a first peak probability; and a decoding module 91, configured to: determine a set of first feature elements and a set of second feature elements from the plurality of feature elements based on a first threshold and the first peak probability corresponding to each feature element; and obtain the to-be-decoded feature map based on the set of first feature elements and the set of second feature elements.

In an embodiment, the first probability estimation result is a Gaussian distribution, and the first peak probability is a mean probability of the Gaussian distribution.

Alternatively, the first probability estimation result is a mixed Gaussian distribution. The mixed Gaussian distribution includes a plurality of Gaussian distributions. The first peak probability is a largest value in mean probabilities of the Gaussian distributions, or the first peak probability is calculated based on mean probabilities of the Gaussian distributions and weights of the Gaussian distributions in the mixed Gaussian distribution.

In an embodiment, a value of the to-be-decoded feature map includes numerical values of all first feature elements in the set of first feature elements and numerical values of all second feature elements in the set of second feature elements.

In an embodiment, the set of first feature elements is an empty set, or the set of second feature elements is an empty set.

In an embodiment, the first probability estimation result further includes a feature value corresponding to the first peak probability. The decoding module 91 is further configured to: perform entropy decoding on the first feature elements based on first probability estimation results corresponding to the first feature elements, to obtain the numerical values of the first feature elements; and obtain the numerical values of the second feature elements based on feature values corresponding to first peak probabilities of the second feature elements.

In an embodiment, the decoding module 91 is further configured to obtain the first threshold based on the bitstream of the to-be-decoded feature map.

In an embodiment, a first peak probability of the first feature element is less than or equal to the first threshold, and a first peak probability of the second feature element is greater than the first threshold.

In an embodiment, the first probability estimation result is the Gaussian distribution. The first probability estimation result further includes a first probability variance value. A first probability variance value of the first feature element is greater than or equal to the first threshold, and a first probability variance value of the second feature element is less than the first threshold.

In an embodiment, the obtaining module 90 is further configured to: obtain side information corresponding to the to-be-decoded feature map based on the bitstream of the to-be-decoded feature map; and obtain the first probability estimation result corresponding to each feature element based on the side information.

In an embodiment, the decoding module 91 is further configured to: obtain side information corresponding to the to-be-decoded feature map based on the bitstream of the to-be-decoded feature map; estimate the first probability estimation result of each feature element for each feature element in the to-be-decoded feature map based on the side information and first context information. The first context information is a feature element that corresponds to the feature element and that is in a preset region range in the to-be-decoded feature map.

Figure 10:
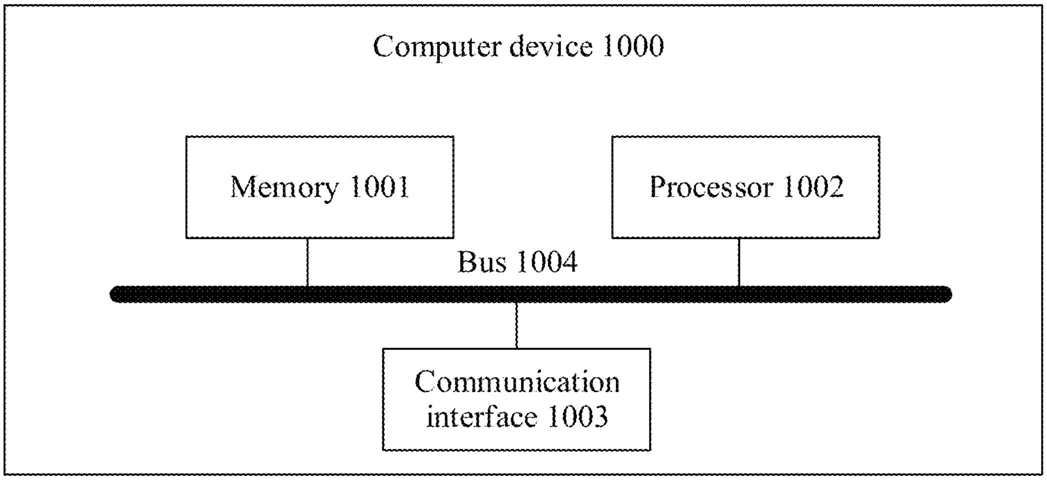
FIG. 10 is a schematic diagram of a structure of a computer device according to an embodiment of this application.

FIG. 10 is a schematic diagram of a hardware structure of a feature map encoding apparatus or a feature map decoding apparatus according to an embodiment of this application. The apparatus (the apparatus may be a computer device 1000) shown in FIG. 10 includes a memory 1001, a processor 1002, a communication interface 1003, and a bus 1004. The memory 1001, the processor 1002, and the communication interface 1003 are communicatively connected to each other through the bus 1004.

The memory 1001 may be a read-only memory (ROM), a static storage device, a dynamic storage device, or a random access memory (RAM). The memory 1001 may store a program. When the program stored in the memory 1001 is executed by the processor 1002, the operations of the feature map encoding method provided in embodiments of this application are performed, or the operations of the feature map decoding method provided in embodiments of this application are performed.

The processor 1002 may be a general-purpose central processing unit (CPU), a microprocessor, an application-specific integrated circuit (ASIC), a graphics processing unit (GPU), or one or more integrated circuits, and is configured to: execute a related program, to implement the functions that need to be performed by units in the feature map encoding apparatus or the feature map decoding apparatus in embodiments of this application, or perform the operations of the feature map encoding method in the method embodiments of this application, or perform the operations of the feature map decoding method provided in embodiments of this application.

Alternatively, the processor 1002 may be an integrated circuit chip, and has a signal processing capability. In an embodiment, the operations of the feature map encoding method or the operations of the feature map decoding method in this application may be completed via an integrated logic circuit of hardware in the processor 1002 or instructions in a form of software. The processor 1002 may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the operations, and logical block diagrams that are disclosed in embodiments of this application. The general-purpose processor may be a microprocessor, or the processor may be any conventional processor or the like. The operations in the methods disclosed with reference to embodiments of this application may be directly performed and completed by a hardware coding processor, or may be performed and completed by using a combination of hardware in the coding processor and a software module. A software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information in the memory 1001, and completes, in combination with hardware of the processor 1002, functions that need to be performed by units included in the feature map encoding apparatus or the feature map decoding apparatus in embodiments of this application, or performs the feature map encoding method or the feature map decoding method in the method embodiments of this application.

The communication interface 1003 uses a transceiver apparatus, for example, but not limited to a transceiver, to implement communication between the computer device 1000 and another device or a communication network.

The bus 1004 may include a path for transmitting information between components (for example, the memory 1001, the processor 1002, and the communication interface 1003) of the computer device 1000.

It should be understood that, in the feature map encoding apparatus in FIG. 8, the obtaining module 80 is equivalent to the communication interface 1003 in the computer device 1000, and the encoding module 81 is equivalent to the processor 1002 in the computer device 1000. Alternatively, in the feature map decoding apparatus in FIG. 9, the obtaining module 90 is equivalent to the communication interface 1003 in the computer device 1000, and the decoding module 91 is equivalent to the processor 1002 in the computer device 1000.

It should be noted that, for functions of the functional units in the computer device 1000 described in this embodiment of this application, refer to descriptions of related operations in the foregoing method embodiments. Details are not described herein again.

An embodiment of this application further provides a computer-readable storage medium. The computer-readable storage medium stores a computer program. The program, when executed by a processor, may implement some or all of the operations recorded in any one of the foregoing method embodiments, and a function of any functional module shown in FIG. 10.

An embodiment of this application further provides a computer program product. When the computer program product runs on a computer or a processor, the computer or the processor is enabled to perform one or more operations in any one of the foregoing methods. When the foregoing modules in the device are implemented in a form of a software functional unit and sold or used as an independent product, the modules may be stored in a computer-readable storage medium.

In the foregoing embodiments, the descriptions in embodiments have respective focuses. For a part that is not described in detail in an embodiment, refer to related descriptions in other embodiments. It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

Persons skilled in the art can appreciate that functions described with reference to various illustrative logical blocks, modules, and algorithm operations disclosed and described herein may be implemented by hardware, software, firmware, or any combination thereof. If implemented by software, the functions described with reference to the illustrative logical blocks, modules, and operations may be stored in or transmitted over a computer-readable medium as one or more instructions or code and determined by a hardware-based processing unit. The computer-readable medium may include a computer-readable storage medium, which corresponds to a tangible medium such as a data storage medium, or may include any communications medium that facilitates transmission of a computer program from one place to another (for example, according to a communications protocol). In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

By way of example and not limitation, such computer-readable storage media may include a RAM, a ROM, an EEPROM, a CD-ROM or another optical disc storage apparatus, a magnetic disk storage apparatus or another magnetic storage apparatus, a flash memory, or any other medium that can store required program code in a form of instructions or data structures and that can be accessed by a computer. In addition, any connection is properly referred to as a computer-readable medium. For example, if an instruction is transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the above should also be included within the scope of the computer-readable medium.

An instruction may be determined by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term “processor” used in this specification may refer to the foregoing structure, or any other structure that may be applied to implementation of the technologies described in this specification. In addition, in some aspects, the functions described with reference to the illustrative logical blocks, modules, and operations described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of iCs (for example, a chip set). Various components, modules, or units are described in this application to emphasize functional aspects of apparatuses configured to determine the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

The foregoing descriptions are merely embodiments of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A method of feature map decoding, comprising:

obtaining a bitstream of a to-be-decoded feature map, wherein the to-be-decoded feature map comprises a plurality of feature elements, and the bitstream of the to-be-decoded feature map comprises an entropy encoding result of side information;

obtaining the side information corresponding to the to-be-decoded feature map based on the bitstream of the to-be-decoded feature map;

estimating a first probability estimation result corresponding to each of the plurality of feature elements using the side information as an input, wherein the first probability estimation result comprises a first peak probability;

determining a set of first feature elements and a set of second feature elements from the plurality of feature elements based on a first threshold and the first peak probability corresponding to each of the plurality of feature elements, wherein the set of first feature elements is a set of feature elements on which entropy encoding was performed in a feature map encoding phase, the set of second feature elements is a set of feature elements on which entropy encoding was skipped in the feature map encoding phase, a first peak probability of the first feature element is less than or equal to the first threshold, and a first peak probability of the second feature element is greater than the first threshold, and the first probability estimation result further comprises a feature value corresponding to the first peak probability;

performing entropy decoding on the first feature elements based on first probability estimation results corresponding to the first feature elements, to obtain numerical values of the first feature elements;

obtaining numerical values of the second feature elements based on feature values corresponding to first peak probabilities of the second feature elements; and obtaining a decoded feature map based on the set of first feature elements and the set of second feature elements, wherein a value of the decoded feature map comprises numerical values of all first feature elements in the set of first feature elements and numerical values of all second feature elements in the set of second feature elements.

2. The method according to claim 1, wherein:

the first probability estimation result is a Gaussian distribution, and the first peak probability is a mean probability of the Gaussian distribution; or the first probability estimation result is a mixed Gaussian distribution comprising a plurality of Gaussian distributions, and the first peak probability is a largest value in mean probabilities of the plurality of Gaussian distributions, or the first peak probability is calculated based on mean probabilities of the plurality of Gaussian distributions and weights of the plurality of Gaussian distributions in the mixed Gaussian distribution.

3. The method according to claim 1, wherein the set of first feature elements is an empty set, or the set of second feature elements is an empty set.

4. The method according to claim 1, further comprising: before determining the set of first feature elements and the set of second feature elements from the plurality of feature elements, obtaining the first threshold based on the bitstream of the to-be-decoded feature map.

5. The method according to claim 1, wherein estimating the first probability estimation result corresponding to each of the plurality of feature elements comprises:

estimating the first probability estimation result of each feature element for each feature element in the to-be-decoded feature map based on the side information and first context information, wherein the first context information is a feature element that corresponds to the feature element and is in a preset region range in the to-be-decoded feature map.

6. A method of feature map encoding, comprising:

obtaining a first to-be-encoded feature map comprising a plurality of feature elements;

obtaining side information of the first to-be-encoded feature map based on the first to-be-encoded feature map;

obtaining a first probability estimation result of each of the plurality of feature elements using the side information as an input, wherein the first probability estimation result comprises a first peak probability;

determining a first threshold based on the first probability result of each of the plurality of feature elements;

determining whether each feature element in the first to-be-encoded feature map is a first feature element or a second feature element based on the first threshold and the first peak probability of the feature element in the first to-be-encoded feature map, wherein the first feature element is a feature element on which entropy encoding is to be performed in a feature map encoding phase, the second feature element is a feature element on which entropy encoding is to be skipped in the feature map encoding phase, a first peak probability of the first feature element is less than or equal to the first threshold, and a first peak probability of the second feature element is greater than the first threshold;

performing entropy encoding on the first feature element when the feature element is the first feature element; and skipping the entropy encoding on the second feature element.

7. The method according to claim 6, wherein:

the first probability estimation result is a Gaussian distribution, and the first peak probability is a mean probability of the Gaussian distribution; or the first probability estimation result is a mixed Gaussian distribution comprising a plurality of Gaussian distributions, and the first peak probability is a largest value in mean probabilities of the plurality of Gaussian distributions, or the first peak probability is calculated based on mean probabilities of the plurality of Gaussian distributions and weights of the plurality of Gaussian distributions in the mixed Gaussian distribution.

8. The method according to claim 6, wherein the first threshold is a largest second peak probability in second peak probabilities corresponding to feature elements in a set of third feature elements.

9. The method according to claim 8, wherein:

the method further comprises:

determining the set of third feature elements from the plurality of feature elements based on a second probability estimation result of each feature element;

the second probability estimation result comprises a feature value corresponding to a second peak probability from the second peak probabilities; and determining the set of third feature elements from the plurality of feature elements comprises:

determining the set of third feature elements from the plurality of feature elements based on a preset error, a numerical value of each feature element, and the feature value corresponding to the second peak probability of each feature element.

10. The method according to claim 9, wherein:

the first probability estimation result is the same as the second probability estimation result; and obtaining the first probability estimation result of each of the plurality of feature elements comprises:

performing probability estimation on the side information to obtain the first probability estimation result of each feature element.

11. The method according to claim 8, wherein:

the method further comprises:

determining a second probability estimation result of each of the plurality of feature elements based on the first to-be-encoded feature map;

the first probability estimation result is different from the second probability estimation result; and determining the second probability estimation result of each of the plurality of feature elements comprises:

obtaining side information of the first to-be-encoded feature map and second context information of each feature element based on the first to-be-encoded feature map, wherein the second context information is a feature element that corresponds to the feature element and is in a preset region range in the first to-be-encoded feature map; and obtaining the second probability estimation result of each feature element based on the side information and the second context information.

12. The method according to claim 6, wherein the method further comprises:

writing entropy encoding results of all the first feature elements into an encoded bitstream.

13. A feature map decoding apparatus, comprising:

a processor; and a memory coupled to the processor to store instructions, which when executed by the processor, cause the feature map decoding apparatus to:

obtain a bitstream of a to-be-decoded feature map, wherein the to-be-decoded feature map comprises a plurality of feature elements, and the bitstream of the to-be-decoded feature map comprises an entropy encoding result of side information;

obtain the side information corresponding to the to-be-decoded feature map based on the bitstream of the to-be-decoded feature map;

estimate a first probability estimation result corresponding to each of the plurality of feature elements by use of the side information as an input, wherein the first probability estimation result comprises a first peak probability;

determine a set of first feature elements and a set of second feature elements from the plurality of feature elements based on a first threshold and the first peak probability corresponding to each of the plurality of feature elements, wherein the set of first feature elements is a set of feature elements on which entropy encoding was performed in a feature map encoding phase, the set of second feature elements is a set of feature elements on which entropy encoding was skipped in the feature map encoding phase, a first peak probability of the first feature element is less than or equal to the first threshold, and a first peak probability of the second feature element is greater than the first threshold, and the first probability estimation result further comprises a feature value corresponding to the first peak probability;

perform entropy decoding on the first feature elements based on first probability estimation results corresponding to the first feature elements, to obtain numerical values of the first feature elements;

obtain numerical values of the second feature elements based on feature values corresponding to first peak probabilities of the second feature elements; and obtain the to-be-decoded feature map based on the set of first feature elements and the set of second feature elements, wherein a value of the decoded feature map comprises numerical values of all first feature elements in the set of first feature elements and numerical values of all second feature elements in the set of second feature elements.

14. A feature map encoding apparatus, comprising:

a processor; and a memory coupled to the processor to store instructions, which when executed by the processor, cause the feature map encoding apparatus to:

obtain a first to-be-encoded feature map comprising a plurality of feature elements;

obtain side information of the first to-be-encoded feature map based on the first to-be-encoded feature map;

obtain a first probability estimation result of each of the plurality of feature elements by use of the side information as an input, wherein the first probability estimation result comprises a first peak probability;

determine a first threshold based on the first probability result of each of the plurality of feature elements;

determine whether each feature element in the first to-be-encoded feature map is a first feature element or a second feature element based on the first threshold and the first peak probability of the feature element in the first to-be-encoded feature map, wherein the first feature element is a feature element on which entropy encoding is to be performed in a feature map encoding phase, the second feature element is a feature element on which entropy encoding is to be skipped in the feature map encoding phase, a first peak probability of the first feature element is less than or equal to the first threshold, and a first peak probability of the second feature element is greater than the first threshold;

perform entropy encoding on the first feature element when the feature element is the first feature element; and skip the entropy encoding on the second feature element.

* * * * *